US009378237B2

(12) United States Patent
van Oortmerssen et al.

(10) Patent No.: US 9,378,237 B2
(45) Date of Patent: Jun. 28, 2016

(54) METHODS FOR IN-PLACE ACCESS OF SERIALIZED DATA

(71) Applicant: Google Inc., Mountain View, CA (US)

(72) Inventors: Wouter van Oortmerssen, San Francisco, CA (US); Martin Froehlich, Redwood City, CA (US)

(73) Assignee: Google Inc., Mountain View, CA (US)

( * ) Notice: Subject to any disclaimer, the term of this patent is extended or adjusted under 35 U.S.C. 154(b) by 241 days.

(21) Appl. No.: 14/253,841

(22) Filed: Apr. 15, 2014

(65) Prior Publication Data

US 2015/0293962 A1    Oct. 15, 2015

(51) Int. Cl.
*G06F 17/30* (2006.01)

(52) U.S. Cl.
CPC .... *G06F 17/30345* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 6,484,247 B1 * | 11/2002 | Gendron | G06F 9/4435 711/124 |
| 2003/0154202 A1 | 8/2003 | Dinker et al. | |
| 2004/0220946 A1 | 11/2004 | Krishnaprasad et al. | |
| 2007/0156729 A1 * | 7/2007 | Shaylor | G06F 5/065 |
| 2014/0067866 A1 | 3/2014 | Chen | |
| 2015/0186259 A1 * | 7/2015 | Thomas | G06F 12/0246 711/103 |

FOREIGN PATENT DOCUMENTS

WO    2013/070561    5/2013

OTHER PUBLICATIONS

Google Inc, "Protocol Buffers Developer Guide—Encoding", Apr. 2, 2012, available via the internet at developers.google.com/protocol-buffers/docs/encoding (last visited Apr. 15, 2014).
Google Inc, "Protocol Buffers Developer Guide—Language Guide", Mar. 5, 2013, available via the internet at developers.google.com/protocol-buffers/docs/proto (last visited Apr. 15, 2014).
Google Inc, "Protocol Buffers Developer Guide—Overview", Apr. 2, 2012, available via the internet at developers.google.com/protocol-buffers/docs/overview (last visited Apr. 15, 2014).
Square, Inc., "Introducing Wire Protocol Buffers", The Corner—Square Engineering Blog, Aug. 23, 2013, available via the internet at corner.squareup.com/2013/08/introducing-wire.html (last visited Apr. 15, 2014).
Square, Inc., "Wire Mobile Protocol Buffers", Mar. 28, 2014, available via the internet at github.com/square/wire/blob/master/README.md (last visited Apr. 15, 2014).

(Continued)

*Primary Examiner* — Alex Gofman
*Assistant Examiner* — Umar Mian
(74) *Attorney, Agent, or Firm* — McDonnell Boehnen Hulbert & Berghoff LLP

(57) ABSTRACT

Methods and apparatus are provided for serializing data. A computing device can generate a serialization buffer (SB). The SB can specify fields storing data and corresponding offsets, with an offset referring to a location in the SB storing the corresponding field. The SB can access a designated field in the SB by determining a designated offset for the designated field, determining a starting location based on the designated offset, and accessing data at the starting location. A distinct copy of the SB can be stored on a storage device.

23 Claims, 10 Drawing Sheets

(56) References Cited

OTHER PUBLICATIONS

K. Varda, "Cap'n Proto: Encoding Spec", Dec. 12, 2013, available via the internet at github.com/kentonv/capnproto/blob/master/doc/encoding.md (last visited Apr. 15, 2014).

K. Varda, "Cap'n Proto: Introduction", Mar. 31, 2013, available via the internet at kentonv.github.io/capnproto/index.html (last visited Apr. 15, 2014).

K. Varda, "Cap'n Proto: Schema Language", Mar. 26, 2014, available via the internet at github.com/kentonv/capnproto/blob/master/doc/language.md(last visited Apr. 15, 2014).

A. Vasiliev, "Binary Serialization Formats", Leopard Blog, Oct. 13, 2013, available via the internet at leopard.in.ua/2013/10/13/binary-serialization-formats/ (last visited Apr. 15, 2014).

Wikimedia Foundation, "Comparison of Data Serialization Formats",Wikipedia, Apr. 15, 2014.

Wikimedia Foundation, "JSON", Wikipedia, Apr. 15, 2014, available via the internet at en.wikipedia.org/w/index.php?title=JSON&oldid=604321432 (last visited Apr. 15, 2014).

Wikimedia Foundation, "Serialization", Wikipedia, Apr. 15, 2014, available via the internet at en.wikipedia.org/w/index.php?title=Serialization&oldid=604324165 (last visited Apr. 15, 2014).

* cited by examiner

160 Example IDL Schema

```
Namespace BasicGame;

table monster
{
    x: float;
    y: float;
    hp: short;
    nm:  string;
} root_type monster;
```

170 – Create Serialization Buffer SB

180 – Add data to SB in depth-first pre-order fashion

182 – Add string "Bill" for field nm to SB i. String format in SB = character count (uchar), characters in string, and null terminator.
  So String = "Bill" looks like this in memory:

184 → | 5 | B | i | l | l | \0 | ii. Add String to SB

SB Index (not stored)

186 →
| 1 | 2 | 3 | 4 | 5 | 6 | 7 | 8 | 9 | 10 | ← 188
| 5 | B | i | l | l | \0 | pad |   |   |    |

190 – Create Monster table in SB i. Table format: virtual table of field references + data for fields
 ii. Monster table has 4 fields: x, y both floats (4 bytes each), hp short
    (2 bytes), and name (reference of type offset_t = 2 bytes long)
 iii. Virtual table format: size of table data + number of fields + offsets.
    Size of table data = size of reference to virtual table (4 bytes) +
    sum of sizes of all fields (12 bytes) = 16 bytes
 iv. Virtual table (V Table) looks like this in memory:

192

| # Fields | Obj Size | x offset | y offset | hp offset | nm offset |
|---|---|---|---|---|---|
| 4 | 16 | 4 | 8 | 12 | 14 | v. Data for fields looks like this in memory:

194

| V Table Ref | x data | y data |
|---|---|---|
| -12 | 1.0 | 2.0 |

| hp data | nm data |
|---|---|
| 28 | 0 | vi. Add virtual table and data for fields to existing SB:

186 / 188

| 1 | 2 | 3 | 4 | 5 | 6 | 7 | 8 | 9 | 10 |
|---|---|---|---|---|---|---|---|---|---|
| 5 | B | i | l | l | \0 | pad | | 4 | |
| 11 | 12 | 13 | 14 | 15 | 16 | 17 | 18 | 19 | 20 |
| 18 | | 4 | | 8 | | 12 | | 14 | |
| 21 | 22 | 23 | 24 | 25 | 26 | 27 | 28 | 29 | 30 |
| -12 | | | | 1.0 | | | | 2.0 | |
| 31 | 32 | 33 | 34 | 35 | 36 | 37 | 38 | 39 | 40 |
| (cont) | | 28 | | 0 | | | | | |

210 Generate an object in a serialization buffer stored in a memory of a computing device, the object as stored in the serialization buffer having a serialization buffer format, where the serialization buffer format specifies one or more fields for storing data of the object and one or more offsets, where an offset of the one or more offsets corresponds to a field of the one or more fields, where an offset of the one or more offsets refers to a storage location in the serialization buffer storing data for the corresponding field, and where the serialization buffer is configured so that data is accessible for a designated field of the object stored in the serialization buffer using the computing device by at least:

↓

212 Determine a designated offset of the one or more offsets corresponding to the designated field

↓

214 Determine a starting location of the serialization buffer for storing data of the designated field, where the starting location is based on the designated offset

↓

216 Provide access to data for the designated field stored in the serialization buffer starting at the starting location of the serialization buffer for storing data of the designated field

↓

220 Store a copy of the serialization buffer on a storage device associated with the computing device, where the copy of the serialization buffer is distinct from the serialization buffer

544 Each computing device reads all three files in this order: T510, T520, T530.

From Figure 5A

Computing Device 510

```
table T510 {
  a: short;
  b: short;
}
```

V Table 552

| 2 | 8 |
|---|---|
| 4 | 6 |

Instance 554
| -8 (V TableRef) | |
| 1 | 2 |

Instance 556
| -16 (V TableRef) | |
| 10 | 20 |

Instance 558
| -24 (V TableRef) | |
| 100 | 200 |

SB 550

Computing Device 520

```
table T520 {
  a: short;
  b: short;
  c: short;
}
```

V Table 562
| 3 | 10 |
| 4 | 6 |
| 8 | |

Instance 564
| -10 (V TableRef) | |
| 1 | 2 |
| 0 | |

566
Instance
| -20 (V TableRef) | |
| 10 | 20 |
| 30 | |

568
| -30 (V TableRef) | |
| 100 | 200 |
| 0 | |

SB 560

Computing Device 530

```
table T530 {
  a: short;
  b: short;
  // c deleted
  d: short;
  e: short;
}
```

V Table 572
| 5 | 12 |
| 4 | 6 |
| 0 | 8 |
| 10 | |

574
| -14 (V Table Ref) | |
| 1 | 2 |
| 0 | |
| 0 | |

576
| -26 (V Table Ref) | |
| 10 | 20 |
| 0 | |
| 0 | |

578
| -38 (V Table Ref) | |
| 100 | 200 |
| 300 | 400 |

SB 570

METHODS FOR IN-PLACE ACCESS OF SERIALIZED DATA

BACKGROUND

When communicating organized data, such as objects or data structures, within or between computer systems, the computer systems can use serialization techniques. Serialization involves translating organized data stored in memory, such as data structures, objects, etc. into a format that can be stored and later re-read by a computer system. For example, the organized data can be stored in a format conducive to storage in a file or memory buffer and/or conducive to transmission between the computer systems. The stored version of organized data can be re-read later to reconstruct a copy of the original in-memory version of the organized data. In some cases, a serialization technique is also called a marshalling technique. Deserialization is the reverse technique of generating organized data from a series of bytes. In some cases, deserialization is also called unmarshalling.

Some systems use the same format for data in memory and for stored data without using a specific serialization format. Not using a specific serialization format has some limitations:

An in-memory object can include data field(s) storing memory addresses to represent data by reference; e.g., pointers and/or data stored in separate blocks of memory. Typically, such memory addresses change each time an application is executed. Then, if memory addresses are written directly from an in-memory object to a stored object, those memory addresses are likely to be invalid when retrieved from the stored object.

Changing data definitions can be difficult, since a stored object using a first data format may not be readable using a changed (second) data format. For example, suppose data D1 is written using the first data format to a disk and then a field is added to the first data format to generate the changed data format. Then, when D1 is read from disk, D1 is missing a field present in the changed data format, which may cause the read of D1 to fail. Similar problems arise when fields are added and/or modified.

Using the same in-memory and storage formats does not account for architectural differences between computer systems, such as alignment, endianness, etc.

Many serialization solutions have been created with web development in mind, and focus on sending relatively small messages. For games, these systems can be prohibitively expensive, as the amount of data per item is higher, yet available memory is more limited.

Many serialization "wire" or communication-oriented formats differ from in-memory formats; e.g., to overcome some/all of the limitations mentioned above. As wire and in-memory formats differ, the data has to be converted between formats during communication For example, in-memory data on computer system A that is to be communicated to computer system B using a wire format can involve: serializing the in-memory data in the wire format on system A, communicate the data to system B using the wire format, and then deserialize the wire-formatted data on system B to bring the data back into an organized in-memory format. This process of serialization, communication, and deserialization can consume both memory and computer cycles merely for formatting data.

SUMMARY

In one aspect, a method is provided. A computing device generates an object in a serialization buffer stored in a memory of the computing device. The object as stored in the serialization buffer has a serialization buffer format. The serialization buffer format specifies one or more fields for storing data of the object and one or more offsets. An offset of the one or more offsets corresponds to a field of the one or more fields and an offset of the one or more offsets refers to a storage location in the serialization buffer storing data for the corresponding field. The serialization buffer is configured so that data is accessible for a designated field of the object stored in the serialization buffer using the computing device by at least: determining a designated offset of the one or more offsets corresponding to the designated field, determining a starting location of the serialization buffer for storing data of the designated field, where the starting location is based on the designated offset, and providing access to data for the designated field stored in the serialization buffer starting at the starting location of the serialization buffer for storing data of the designated field. A copy of the serialization buffer is stored on a storage device associated with the computing device, where the copy of the serialization buffer is distinct from the serialization buffer.

In another aspect, a computing device is provided. The computing device includes a processor and a tangible computer readable medium. The tangible computer readable medium is configured to store at least executable instructions. The executable instructions, when executed by the processor, cause the computing device to perform functions including: generating an object in a serialization buffer stored in the tangible computer readable medium, the object as stored in the serialization buffer having a serialization buffer format, where the serialization buffer format specifies one or more fields for storing data of the object and one or more offsets, where an offset of the one or more offsets corresponds to a field of the one or more fields, where an offset of the one or more offsets refers to a storage location in the serialization buffer storing data for the corresponding field, and wherein the serialization buffer is configured so that data is accessible for a designated field of the object stored in the serialization buffer using the computing device by at least: determining a designated offset of the one or more offsets corresponding to the designated field, determining a starting location of the serialization buffer for storing data of the designated field, where the starting location is based on the designated offset, and providing access to data for the designated field stored in the serialization buffer starting at the starting location of the serialization buffer for storing data of the designated field; storing a copy of the serialization buffer on the storage device, where the copy of the serialization buffer is distinct from the serialization buffer.

In another aspect, an article of manufacture is provided. The article of manufacture includes a tangible computer readable medium configured to store at least executable instructions. The executable instructions, when executed by a processor of a computing device, cause the computing device to perform functions comprising: generating an object in a serialization buffer stored by the computing device, the object as stored in the serialization buffer having a serialization buffer format, where the serialization buffer format specifies one or more fields for storing data of the object and one or more offsets, where an offset of the one or more offsets corresponds to a field of the one or more fields, where an offset of the one or more offsets refers to a storage location in the serialization buffer storing data for the corresponding field, and where the serialization buffer is configured so that data is accessible for a designated field of the object stored in the serialization buffer using the computing device by at least: determining a designated offset of the one or more offsets corresponding to the designated field, determining a starting location of the serialization buffer for storing data of the designated field, where the starting location is based on the designated offset, and providing access to data for the designated field stored in the serialization buffer starting at the starting location of the serialization buffer for storing data of the designated field; store a copy of the serialization buffer on a storage device associated with the computing device, where the copy of the serialization buffer is distinct from the serialization buffer.

In another aspect, a computing device is provided. The device includes: means for generating an object in a serialization buffer stored in storage means, the object as stored in the serialization buffer having a serialization buffer format, where the serialization buffer format specifies one or more fields for storing data of the object and one or more offsets, where an offset of the one or more offsets corresponds to a field of the one or more fields, where an offset of the one or more offsets refers to a storage location in the serialization buffer storing data for the corresponding field, and where the serialization buffer is configured so that data is accessible for a designated field of the object stored in the serialization buffer by at least: determining a designated offset of the one or more offsets corresponding to the designated field, determining a starting location of the serialization buffer for storing data of the designated field, where the starting location is based on the designated offset, and providing access to data for the designated field stored in the serialization buffer starting at the starting location of the serialization buffer for storing data of the designated field; means for storing a copy of the serialization buffer on means for storage, where the copy of the serialization buffer is distinct from the serialization buffer.

BRIEF DESCRIPTION OF THE DRAWINGS

FIGS. 1B and 1C together depict a scenario for generating a serialization buffer from an IDL schema, in accordance with an embodiment;

FIG. 2 is a flow chart illustrating a method for serializing data, in accordance with an embodiment;

FIGS. 5A and 5B together depict a scenario for communicating data objects having different formats among three computing devices using serialization buffers, in accordance with an embodiment;

DETAILED DESCRIPTION

Figure 1A:
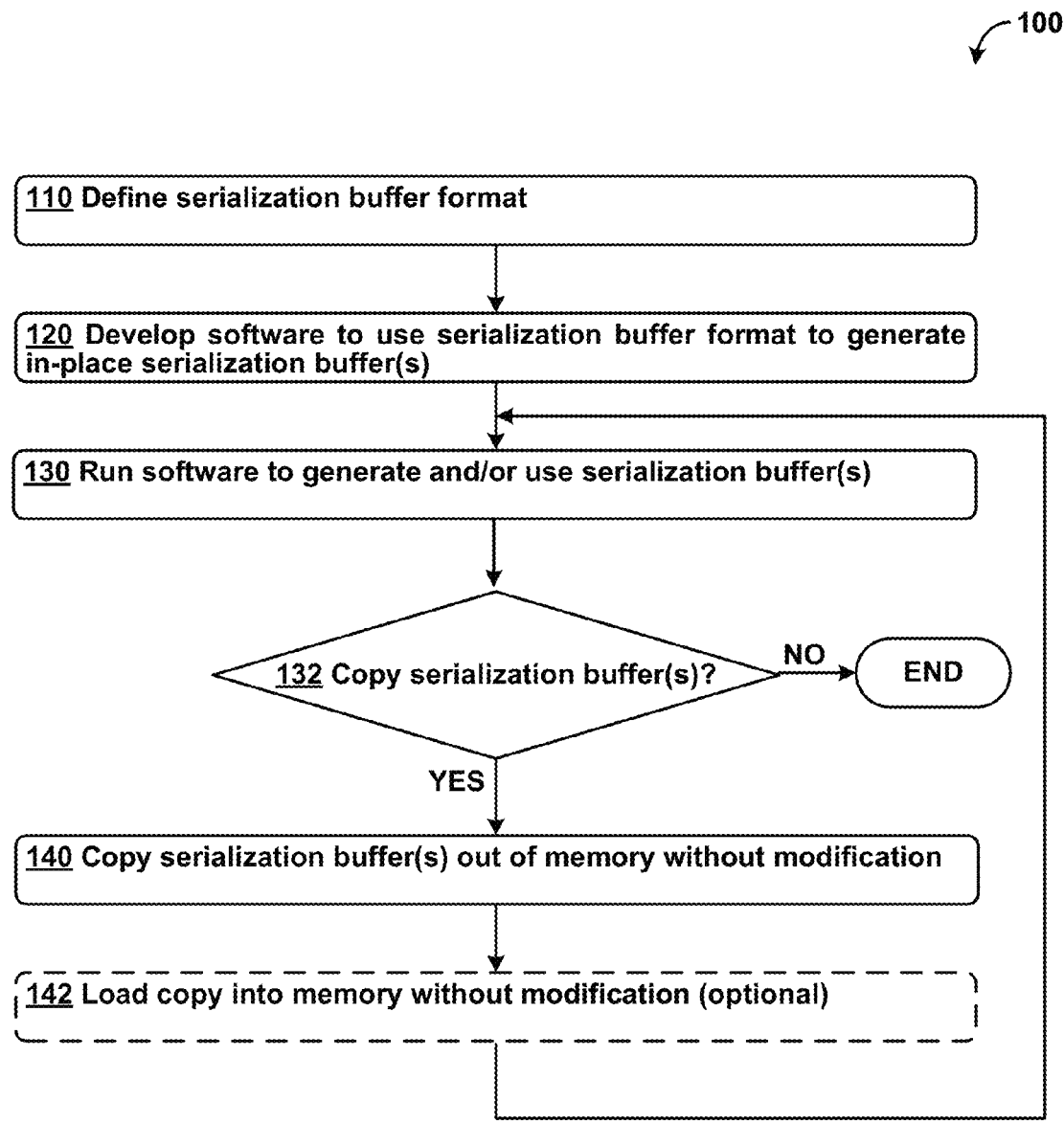
FIG. 1A is a flow chart illustrating a method for generating and using serialization buffers, in accordance with an embodiment.

Software for In-Place Access of Serialized Data

Examples herein provide software and/or hardware related to in-place access of serialized data. Example described serialization techniques can represent hierarchical data in a flat binary serialization buffer in such a way that the data can still be accessed directly without parsing/unpacking, while also still supporting data structure evolution; i.e., providing forwards/backwards compatibility.

These serialization techniques can utilize a schema file that allows a data designer/software developer to define the data structures for serialization. Fields of the data structures can be of various types, such as scalar types (e.g., integers, characters, floating point numbers), arrays, strings, object or other references, and unions. Fields defined in the schema file are optional and have defaults, so data defined by the schema file but missing in the binary buffer can be handled gracefully.

In some embodiments, all fields defined in the schema file can be optional—that is, an optional field may or may not be present in a data structure based on the schema file definition. For example, a "name" field can have a number of different formats—first name, last name, a middle name, a nick name, a combination of two or more names such as first and last name), one or more references to a list of names, and so on. In this example, the "name" field may be an optional field.

In other embodiments, a field can be either optional or fixed, perhaps with optional fields being the default. In this context, once a fixed field is defined in a schema file, the definition of the fixed field cannot be modified. For example, a "lat-long" field can have two floating point numbers—one for latitude and one for longitude—and the lat-long field likely will not change. Then, the lat-long field can be declared as fixed once defined. In particular embodiments, a fixed field can allow for more direct and faster encoding than an optional field. In some cases, arrays of fixed fields can be accessible via fast memory routines; e.g., the Portable Operating System Interface (POSIX®) memcpy ( ) routine or a similar function.

A schema-file compiler for the serialization techniques can generate object definitions, such as C++ header file(s) with helper classes, to access and construct serialized data defined by the schema file. For example, a BufferBuilder helper class can be used to construct a serialization buffer. The generated object definitions allow in-place traversal of the fields in the buffer using methods such as object1→field1( ) to access a field "field1" in an object "object1" defined in the schema file.

In some example serialization techniques, the only memory needed to access serialized data is memory required for the serialization buffer. In particular, data can be represented and stored within the serialization buffer without reference to memory locations outside of the serialization buffer. Then, as the only memory references made are references internal to the serialization buffer, serialization buffers can be written directly from memory to a storage device and/or communicated without concern for invalid data references; i.e., pointers to data not stored with of the serialization buffer.

Example serialization techniques can be used with memory mapping and streaming, such that only part of the buffer needs to be in memory. Accessing the flat serial buffer is close to the speed of access of data stored without serialization, with only a small amount of additional time to accessing data offsets stored in a "virtual table" (V Table).

The use of virtual tables and data offsets allows for format evolution and optional fields. Using optional fields can provide both forwards and backwards compatibility as well as providing a data designer/software engineer with options on data that is or is not written to the buffer, and thus how data structures are designed. In some embodiments, the herein-described serialization techniques can utilize small amounts of generated code and a single small header as the minimum dependency, which can lead to easy integration of the serialization techniques into larger software packages.

The serialization techniques can be utilized in software written in strongly-typed languages; e.g., the C family of languages. Strong typing enables error checking and correction at compile time rather than manually having to write repetitive and error prone run-time checks. The above-mentioned embodiments of the serialization techniques can generate code in a well-known strongly-typed software language, such as C++, that allows terse access and construction. In particular of these embodiments, functionality for parsing schemas at runtime can be provided. In other particular of these embodiments, text representations similar to those available using JavaScript Object Notation (JSON) can be utilized.

Other serialization software, such as Protocol Buffers differ from the herein-described serialization techniques by utilizing a parsing/unpacking/deserialization process to a secondary representation before accessing data, often coupled with per-object memory allocation. That is, the above-mentioned embodiments of the serialization techniques can utilize the same format in all types of storage scenarios; e.g., there is one format used for in-memory, disk, and wire access. Then, the example serialization techniques described herein can avoid use of parsing, unpacking, and deserialization processes.

Other serialization formats, such as JSON, are text-based and thus relatively easy to read and convenient for with dynamically typed languages such as JavaScript. When serializing data from statically typed languages however, text-based formats can exhibit runtime inefficiencies by using a dynamically typed serialization system. For examples, text-based formats may have to be parsed at run time, consuming processor cycles and memory for the parsing process. Further, even though dynamic typing seems easier to write software by not requiring predefined types of data items, frequently a programmer has to write more code to access data using dynamically typed systems with statically typed languages.

In some embodiments, both schemaless and schema based data access are provided. Schemaless data access can be enabled by using an optional manifest header with each binary representation of serialized data, where the manifest header compactly describes the serialized data contained, so that the binary representation can be read without a schema. Having a schema, such as an Interface Definition Language (IDL) schema, allows code generation of helper methods, functions, and data that ease data manipulation, such as symbolic constants, structures, and accessor methods. The helper methods, functions, and data, can enable automatic backwards compatibility by having the generated code provide default values for undefined and/or no longer defined fields.

The herein-described serialization techniques provide a single data format that supports hierarchical data, backwards/forwards compatibility, and fast data reads with random access, especially for C-language based software. The single data format can be used to read, write, and communicate data for a wide number of applications and so can be used by projects where spending time and space in accessing and/or constructing serialized data is undesirable, such as in real-time game projects and other performance sensitive applications. Using a single data format for in-memory and wire access can eliminate time and memory spent converting between formats. Embodiments of these serialization techniques provide for forward and backward compatible access to stored data, easing data evolution concerns as the project evolves.

Introductory Examples for IDL Schema and Serialization Buffers

FIG. 1A is a flow chart illustrating method 100 for generating and using serialization buffers, in accordance with an embodiment. Method 100 can start at block 110, where a serialization buffer format can be defined. For example, the serialization buffer format can be defined using the herein-described IDL or using another language; e.g., JSON, C, C++, Java, and/or some other language.

At block 120, software can be developed to use the serialization buffer format to generate one or more in-place serialization buffers in a memory of a computing device. The software can be written by hand, generated by processing the serialization buffer format (e.g., as discussed below), and/or developed using other techniques.

Each serialization buffer can store data and offsets/references to the stored data. An in-place serialization buffer is a serialization buffer that uses a fixed amount of storage to store the data. In some embodiments, an in-place serialization buffer that is stored contiguously can include offsets/references that only refer to memory locations inside of the in-place serialization buffer. In these embodiments, the in-place serialization buffer can be copied without concern for dangling references, as the offsets/references of the serialization buffer can refer to memory locations inside of the in-place serialization buffer alone.

At block 130, the software can be executed to generate and/or use the one or more serialization buffers in the memory of the computing device. For example, scenario 150 and FIGS. 1B and 1C, among others, describe generation of serialization buffers, and scenario 300 and FIG. 3, among others, describe use of serialization buffers.

At block 132, a decision can be made whether or not at least one serialization buffer of the one or more serialization buffers is to be copied—that is, the at least one serialization buffer can be copied from the memory of the computing device to another portion of memory, copied to a storage device other than memory, transmitted to one or more other computing devices for storage using the other computing device(s), and/or otherwise copied.

If at least one of the one or more serialization buffers is to be copied, then method 100 can proceed to block 140. Otherwise, the serialization buffer(s) are not copied, and so method 100 can end.

At block 140, the at least one of the one or more serialization buffers can be copied without modification. In method 100, the data of a serialization buffer being copied is to be preserved in the copy as part of the copy procedure, and so the data of the serialization buffer being copied is not modified during copying. Further, as the offsets/references in the serialization buffer being copied are offsets/references within the serialization buffer, the offsets/references in the serialization buffer are not to be modified during copying. Thus, each of the data and offsets/references in the copy of the serialization buffer can be the same as the data and offsets/references in the serialization buffer being copied.

If the copied serialization buffer(s) are to be loaded back into the memory of the computing device; e.g., loaded into the memory from a storage device, then method 100 can proceed to block 142. At block 142, the computing device can load the copied serialization buffer(s) into the memory of the computing device. FIG. 1A shows block 142 using dashed lines to indicate that block 142 is optional. After completing block 140 and perhaps block 142, method 100 can proceed to block 130.

FIGS. 1B and 1C together depict scenario 150 for generating a serialization buffer from an IDL schema, in accordance with an embodiment. The IDL schema can be used to specify data to be stored within the serialization buffer. After the data is specified, the example serialization buffer system can parse the IDL schema to generate software for working with serialization buffers. Examples of the software for working with serialization buffers include, but are not limited to, accessor functions and/or methods for reading data from the serialization buffer, data setting functions and/or methods for writing data to the serialization buffer, and utility functions and/or methods. Utility functions and/or methods can be used to manage serialization buffers, such as, but not limited to, functions and/or methods to: create a serialization buffer, create structures within the serialization buffer (e.g., tables, strings, vectors), and to finish a serialization buffer.

An example serialization buffer can be stored as one or more collections of data items, or fields, arranged in a table. The data fields can be referenced using a virtual table, or list of offsets, with one offset per field, within the serialization buffer that indicate the starting addresses of the field(s) in a table. The size of each field can be specified indirectly by the type of the field specified by the IDL schema—for example, a short integer has a size of two bytes, so a field specified as a "short" would have a corresponding size of two bytes. As such, the accessor and data setting functions and/or methods can be generated to access each field in a table using the data from the virtual table and the IDL schema.

FIG. 1B shows example IDL schema 160 used in scenario 150 for specifying a namespace called "Basic Game", a table for a "monster", and a root type for a corresponding serialization buffer of "monster."

The namespace specification in IDL enables generation of a corresponding namespace for use by the generated software for working with serialization buffers. The root type specification in IDL indicates to the generated software for working with serialization buffers what the root table of a serialization buffer is to be—in some examples, serialization buffers can be considered as having a tree structure with the root table at the root of the tree structure.

An IDL table specifies data in one or more fields. Each field has a name and a type—for example, the monster table of schema 160 specifies four fields: a floating point integer, or float, named "x", another floating point integer named "y", a short integer named "hp", and a string of characters named "nm". IDL is discussed in more detail in the following section.

In scenario 150, as part of a game project, a monster table for a monster named Bill at a (x, y) position whose hit point or "hp" value is 28 is to be created and stored within a serialization buffer SB. To start the project, at 170, serialization buffer SB can be created using a utility function; e.g., BufferBuilder. The BufferBuilder utility function can be called directly as a function operating on a data structure representing SB, a method operating on an object representing SB, and/or as part of an initialization/creation method of the object representing SB.

Once SB is created, at 180, data can be added to SB. To ensure correctness of the serialization buffer SB, data can be added to SB in depth-first, pre-order fashion. For example, data for relatively complex sub-structures of the root type, such as strings, vectors, and sub-tables, can be added to the serialization buffer before the root type is added.

Then, at 182, a string for the nm field can be added to serialization buffer SB, perhaps using a utility function and/or method. In the example serialization buffer SB, a string includes three sub-fields: a count sub-field storing a number of characters (0-255) in the string, zero or more characters storing the string data for the field, and a null terminator character, e.g., "\0", to end the string. FIG. 1B shows the string 184 in memory for "Bill" with a count sub-field of "5" representing four characters storing the letters "B", "i", "l", and "l" and one character "\0" for the null terminator.

String 184 can be added to serialization buffer SB as part of data 186, where SB is shown in FIG. 1B with index 188, shown with a grey background, indicating positions or offsets within serialization buffer SB. In some embodiments, an underlying computer architecture can require data to be stored in memory on 32-bit (4 byte), 64-bit (8 byte), or other boundaries. That is, data for a 32-bit system has to be allocated in multiples of 32 bits, or equivalent multiples of 4 bytes.

In scenario 150, the underlying computer architecture requires data to be stored on 32-bit boundaries. As data 186 takes 6 bytes to store the string "Bill", data 186 is not, by itself, on a 32-bit boundary. Data that is not on a 32-bit boundary, such as data 186, can be padded with additional storage so that the data as padded is on the 32-bit boundary. For example, FIG. 1B shows data 186 with 6 bytes used to store string 184 and 2 bytes used for padding, at index positions 7 and 8. Then, data 186 as padded occupies 8 bytes to be on a 32-bit boundary.

Figure 3:
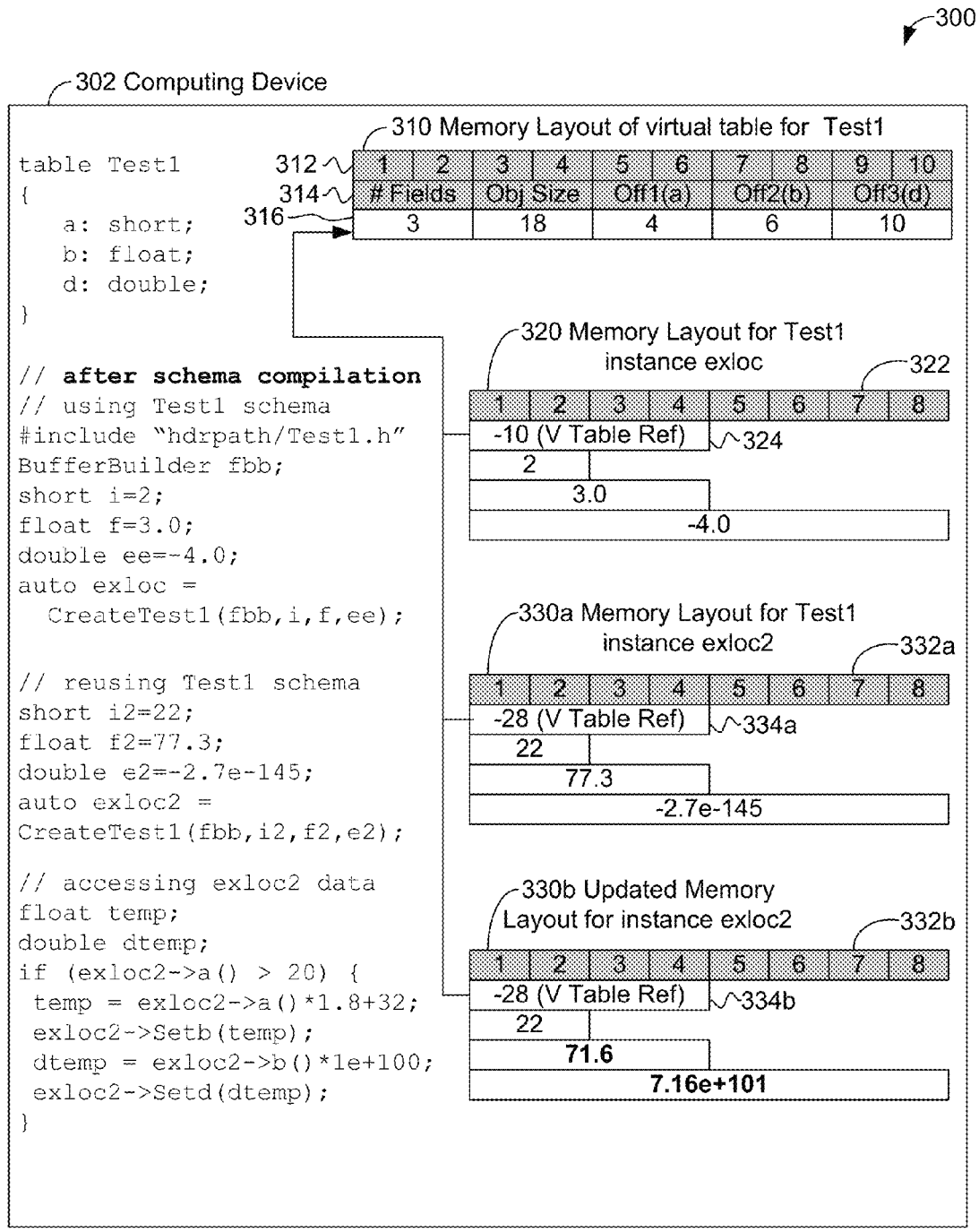
FIG. 3 depicts a scenario for generating data objects using a computing device, in accordance with an embodiment.

Unless otherwise stated with respect to FIGS. 1B, 1C, and 3, fields with grey backgrounds in each figure are not stored. Rather, fields with grey backgrounds are shown in the FIGS. 1B, 1C, and 3 for illustrative purposes only.

Turning to FIG. 1C, at 190, the monster table can be created in serialization buffer SB. The format of a table in serialization buffer SB can have two components: a virtual table and data for the fields of the table. In the specific example of a "monster" table, the table has 4 fields:

x, a floating point number that can be stored in four bytes;
y, another floating point number that can be stored in four bytes;
hp, a short integer that can be stored in two bytes; and
nm, a string.

As indicated at 182, nm is already stored in SB, so the table can store an unsigned offset, or reference, to the stored string within SB. In scenario 150, unsigned offsets are stored in two bytes of data and signed offsets are stored in four bytes of data. Therefore, data for a specific "monster" can be stored in SB using 4+4+2+2=12 bytes.

The data stored for a specific monster can further have a signed reference to a virtual table that specifies offsets for the data—this reference can be stored in four bytes. Then, a total object size for an instance of an object stored in SB using the monster table format can occupy: 12 bytes for the data+4 bytes for the virtual table reference=16 bytes total object size.

A virtual table can have the following format:
a number of fields in the table, which can be stored in a short integer two bytes long;
an object size, which can be the total object size for one instance of the virtual table, where the object size can be stored in a short integer; and
an unsigned field offset for each field two bytes long.

In the example virtual table 192 shown in FIG. 1C, the total size of the virtual table is 12 bytes, with 2 bytes storing the number of fields, 2 bytes storing for the object size, and 8 bytes to store 4 field offsets at 2 bytes/offset.

FIG. 1C shows an example virtual table 192 as laid out in memory. As the monster table has 4 fields, the number of fields ("# Fields") value for virtual table 192 is set to 4. As each instance of an object stored using the monster table can be stored in 12 bytes accompanied by a four byte virtual table reference, the object size ("Obj Size") field is shown in FIG. 1C with a value of 16.

The offsets for the x, y, hp, and nm fields, shown specified in the order used in the IDL schema defining the monster table, are shown with respective values of 4, 8, 12, and 14. In the example serialization buffer SB, the reference to the virtual table is stored preceding data for the fields of the monster table. Therefore, the offset from the beginning of the data for the monster table object to the x field is 4 bytes, as the first four bytes are occupied by the reference to the virtual table. Then, the offset to the y field is 8, as the first four bytes are occupied by the reference to the virtual table, and the next four bytes are occupied by the x field. Additionally, the offset to the hp field is 12, as the first four bytes are occupied by the reference to the virtual table, the next four bytes are occupied by the x field, and the following four bytes are occupied by the y field. Finally, the offset to the nm field is 14, as the first four bytes are occupied by the reference to the virtual table, the next eight bytes are occupied by the x and y fields, and the following two bytes are occupied by the hp field.

Data 194 shows an example layout of the data for the specific instance of the object specified by the monster field. As indicated immediately above, the data is preceded by a reference to the virtual table (V Table Ref) whose value is −12. The value of −12 indicates that the beginning of the virtual table starts 12 bytes before the location storing the reference to the virtual table. As the virtual table occupies 12 bytes of storage, the −12 value implies the virtual table 192 is stored contiguously with and just before data 194.

Virtual table 192 and data 194 can then be added to serialization buffer SB. In the example shown in FIG. 1C, virtual table 192 starts at byte index 9 of data 186 for SB and ends at byte index 20, and data 194 for the monster table starts at byte index 21 of data 186 for SB and ends at byte index 36. After virtual table 192 and data 194 are added to serialization buffer SB, scenario 150 can end.

Schema Definition using IDL

In some embodiments, a language, such as but not limited to IDL, can be used to write schema for the herein-described serialization techniques. The syntax of IDL is based on the syntax for defining data in the C family of languages, and also to users of other interface definitions. Table 1 below shows an example schema definition using IDL:

TABLE 1

```
// example IDL file
namespace MyGame;
enum Color { Red = 0, Green, Blue }
union Any { Monster, Vec3 }
struct Vec3 {
    x:float;
    y:float;
    z:float;
}
table Monster {
    pos:Vec3;
    mana:short = 150;
    hp:short = 100;
    name:string;
    friendly:bool = false (deprecated, priority: 1);
    inventory:[uchar];
    color:char = Blue;
    test:Any;
}
root_type Monster;
```

IDL tables are the main way of defining objects used by the serialization techniques. In the example shown in Table 1 above, a table named Monster is defined with eight fields: pos, mana, hp, name, friendly, inventory, color, and test. Each field of a table can have a name, a type, and an optional default value (e.g., if a value is omitted, the default value can be 0, NULL, or some other reasonable default value). For example, the mana field of the Monster table is of type short and has a default value of 150.

Each field of an IDL table is optional; that is, fields can be omitted or added on a per object basis. Making all fields optional both provides flexibility to add fields without making data objects overly large. Further, the use of optional fields provides for both forward and backwards compatibility. When new fields are added, data that was written without the new fields can still be read correctly into objects that have new fields, as the not-present new fields will be initialized to default values. For backward compatibility, code not utilizing a new field can ignore the new field.

In some embodiments, fields of an IDL table are not deleted, but are rather marked as unused and data is no longer written into unused fields, thus having the effect of deleting the field. In the schema file, a field can be marked as deprecated to instruct a schema compiler to not generate access functions for the deprecated field as a way to enforce virtual deletion of the field An IDL struct is similar to an IDL table in that both structs and tables can be used to specify data structures with multiple fields. In some embodiments, data generated using IDL structs can use less memory and provide faster access than using IDL tables. In these embodiments, no fields in an IDL struct are optional and fields may not be added or be deprecated. Thus, in these embodiments, IDL structs can be used for objects that are unlikely to change, such as the vec3 example struct shown in Table 1 above.

Some example scalar types that can be used in the IDL include:
  char, uchar, and bool types, each of which can represent 8 bits of data,
  short and ushort types, each of which can represent 16 bits of data,
  int, uint, and float types, each of which can represent 32 bits of data,
  long, ulong, and double types, each of which can represent 64 bits of data,
  a string type, which can represent storage for one or more characters; e.g., stored using UTF-8 format, or an arbitrary binary object; e.g., a blob
  a vector type, which can represent storage for one or more items of some other type, where the other type is specified as part of defining a vector. In some cases, nesting vectors can involve wrapping an inner vector in a struct or table, and
  references to other tables or structs, enums or unions. Enums and unions are discussed immediately below.

An IDL enum can define a sequence of named constants, each with a given value, or increasing by one from the previous one by default, where the first value is 0 by default. To create a field that can hold enum values, any integer scalar type available in the IDL can be used (int, uint, short, or u short). The enum type can be used as well, where the enum type corresponds to a short integer type by default.

Table 1 includes the following example of an enum: enum Color {Red=0, Green, Blue}. In this example, the Color field can have one of three enum values: Red, which corresponds to an integer value of 0, Green corresponding to 1, and Blue corresponding to 2.

IDL unions share a lot of properties with IDL enums, but instead of new names for constants specified by an enum, an IDL union field includes names of tables and structs. A union field can be declared in IDL that can hold a reference to any of those types. When the schema file with a union field is compiled, a hidden field with the suffix_type is generated for holding the corresponding enum value, enabling run-time testing/verification of a type that the union corresponds to at runtime.

Table 1 includes the following example of a union: enum union Any {Monster, Vec3}. In this example, the Any field can either refer to a Monster table or a Vec3 struct. Also, the Any_type hidden field can be used at run time to determine whether a Monster or a Vec3 is being stored in the union.

Beyond definitions for tables, structs, enums, and unions, Table 1 has two additional statements: a namespace MyGame; statement and a root_type Monster; statement. An IDL namespace statement can be used to specify generation of a corresponding namespace in C++ for helper code. An IDL root_type can be used to declare a root table (or struct) of the serialized data.

Table 2 below shows an example grammar for the herein-described IDL.

TABLE 2 schema = namespace_decl | type_decl | enum_decl | root_decl | object
namespace_decl = namespace ident ;
type_decl = ( table | struct) ident metadata { field_decl+ }
enum_decl = ( enum | union ) ident metadata { commasep( enumval_decl ) }
root_decl = root_type ident ;
field_decl = type : ident [ = scalar ] metadata ;
type = bool | char | uchar | short | ushort | int | uint |
    float | long | ulong | double | string | [type]| ident
enumval_decl = ident [ = integer_constant ]
metadata = [ ( commasep( ident [ : scalar ] ) ) ]
scalar = integer_constant | float_constant | true | false
object = { commasep( ident : value ) }
value = scalar | object | string_constant | [ commasep( value )]
commasep(x) = [ x ( , x )* ]

In Table 2, terminal strings for the grammar are shown in a fixed font, e.g., namespace, and non-terminals for the grammar are shown in a variable width font, e.g., namespace_decl. Other grammars for IDLs are possible as well.

In some embodiments, IDL files can include comments. Comments can be specified in IDL as in most C based languages; e.g., by surrounding a comment by /* and */ or by preceding an end-of-line comment with //. Additionally, one or more triple comments (///), each on a line by itself, signals that this is documentation for whatever is being declared on the line(s) after the triple comment(s); e.g., specification of a table, struct, etc. Then, the triple comment(s) can be output in the corresponding helper code generated during compilation of the IDL schema.

In some embodiments, IDL statements can include attributes. Attributes can be attached to a declaration, behind a field, or after the name of a table, struct, union, or enum. Attributes may or may not have a value. Some attributes like "deprecated" are understood by the compiler. Other attributes, like the "priority" attribute shown in Table 1, can be ignored by the compiler but used by other software; e.g., code generators, code editors, etc. Attributes can be used to add additional information specific to a particular software project, such as help text.

As indicated above, an IDL schema can be compiled into helper code; e.g., helper code in C++. For example, suppose the schema specified in Table 1 is in a file called mygame.idl. Then a compiler, which can be part of the herein-described serialization techniques, can be used to generate helper code and definitions; e.g., a C++ header file called mygame_generated.h using a command line such as "flatc-c mygame.idl", where "flatc" is the name of an executable for the compiler. Once generated, the mygame_generated.h header file can be used in a C-language based program; e.g., by #including the mygame_generated.h header file. The generated header file can include other header files; e.g., a header file that includes references to software that at least partially embodies the herein-described serialization techniques.

An example of a serialization buffer can be a flat binary buffer configured with suitable storage for storing data used in the herein-disclosed serialization techniques. The following example statement in a C-language-based programming language can be used to create the serialization buffer fbb:

BufferBuilder fbb;

Following the example of Table 1, the serialization buffer fbb can be used to serialize a Monster table. Before serializing a Monster, any objects that are contained therein can be serialized before serializing the Monster. That is, data should be serialized in a depth first, pre-order fashion, perhaps using a tree structure to organize data for serialization. For an example of depth-first, pre-order serialization based on the IDL schema of Table 1, the following example statements in a C-language-based programming language can be executed prior to serializing a Monster:

```
auto name = fbb.CreateString("MyMonster");
unsigned char inv[ ] = { 0, 1, 2, 3, 4, 5, 6, 7, 8, 9 };
auto inventory = fbb.CreateVector(inv, 10);
auto vec = CreateVec3(fbb, 1, 2, 3);
```

The statements immediately above can be used to serialize non-scalar components of the Monster table. The CreateString ( ) and CreateVector ( ) methods serialize the respective two scalar (built-in) datatypes, and return offsets into the serialization buffer that indicates where respective data values are stored, allowing the Monster table to refer to the data values. In some embodiments, other representations of a string other than a string constant (e.g., "MyMonster") can be passed into CreateString ( ) For example, CreateString ( ) can use a std::string, or a constant character reference (e.g., a pointer) with an explicit length, and is suitable for holding UTF-8 and any binary data if needed. In other embodiments, a std::vector can be passed into CreateVector ( ). The returned offset is typed, i.e. can only be used to set fields of the correct type below. The CreateVec3( ) function is an example of a function generated from the schema of Table 1, as the schema in Table 1 defines the vec3 struct.

After the non-scalar components of the Monster are serialized, the following example statements in a C-language-based programming language can be executed to serialize the Monster table:

```
auto mloc = CreateMonster(fbb, vec, 150, 80, name, true,
    inventory, Color_Red) ;
```

Recall that Monster is a table and so not all fields have to be set initially to create the table (as opposed to a struct, such as the example vec3, where all fields have to be initialized at creation time). If a programmer wants to leave fields out at time of creation, the Monster is a table can be built field by field, as indicated with the following example statements in a C-language-based programming language:

```
MonsterBuilder mb(fbb);
mb.add_pos(vec);
mb.add_hp(80);
mb.add_name(name);
mb.add_inventory(inventory);
auto mloc = mb.Finish( );
```

The statements above start by creating an object mb whose type is class MonsterBuilder. The MonsterBuilder class can be part of code generated by compilation of the example IDL schema shown in Table 1. Then, the statements above continue by calling various add_ methods of the MonsterBuilder class to assign data to fields of the Monster table. After the example add_ methods are called, a call to the Finish ( ) method of the MonsterBuilder class can complete the mb object. Note that these example statements do not include setting values for the mana, friendly (which may be unused as being deprecated), color, and Any fields in the Monster table. As such, the uninitialized fields take their respective default values of 150, false, Blue, and NULL.

Fields may also be added to a serialization buffer in any order. For example, to aid alignment of data, adding fields in an order that has fields of the same size adjacent to each other can be utilized. Regardless of whether the example CreateMonster method or MonsterBuilder method is used, the return value of these methods is an offset to the root of the serialization buffer. In the example statements shown above, the root is stored in the mloc variable. Then, the serialization buffer can be finished using a call to the Finish ( ) method of the BufferBuilder class, such as: fbb.Finish (mloc). Once finished, the serialization buffer is now ready to be stored, sent over a network, be compressed, or otherwise processed. A starting address of the serialization buffer can be accessed using a GetBufferPointer ( ) method of the BufferBuilder class and a size of the Monster object from using a GetOffset ( ) method of the BufferBuilder class.

Once data has been serialized into a serialization buffer, the serialization buffer can be stored, transmitted, copied, etc. and then the buffer can be read at a later time. For example, suppose a serialization buffer generated using the schema of Table 1 has been received from some source (e.g., a disk, flash drive, network connection.).

The following example statements in a C-language-based programming language show an example of verifying data obtained from a serialization buffer:

```
auto monster = GetMonster(buffer_pointer);
assert(monster->hp( ) == 80);
assert(monster->mana( ) == 150); // default
assert(!strcmp(monster->name( )->c_str( ), "MyMonster"));
```

In the first example statement above, which is "auto monster=GetMonster (buffer_pointer)" a serialization buffer storing a Monster table is referred to using the buffer_pointer variable. For example, the referred-to Monster table can be generated using either the example CreateMonster method call above or the example MonsterBuilder method call above. The GetMonster ( ) call in the first statement can be used to retrieve a reference to a Monster table stored in the serialization buffer. For example, the variable monster in the first statement above can have type Monster * and can point to an address inside the serialization buffer that stores a Monster table.

Then, each of the assert statements above (e.g., the second, third, and fourth example statements most immediately above) should be true for a Monster table generated using either the example CreateMonster method call above or the example MonsterBuilder method call above. For example, the second example statement above, which is assert (monster→hp ( )==80); can involve accessing a value in the hp field of the referred-to Monster table via the monster→hp ( ) method call of the Monster class and compare the accessed hp value to a static value of 80. Recall from Table 1 that 80 is the default value for the hp field, and that the hp field was initialized to 80 in both the example CreateMonster and MonsterBuilder method calls above.

The next three example statements in a C-language-based programming language illustrate accessing a sub-object of the Monster table—in this example, the sub-object is the Vec3 object:

```
auto pos1 = monster->pos( );
assert(pos1 != NULL);
assert(pos1->z( ) == 3);
```

The first statement above, "auto pos1=monster→pos ( )" includes a call to an accessor method monster→pos ( ) Accessor methods can be used to access data fields in objects, such as the pos struct in the Monster table. In this case, a pos1 variable is assigned to store a reference to the pos struct in the Monster table. The reference can be obtained using the accessor method monster→pos ( ). The second statement above, "assert (pos1!=NULL);" can generate an error message if the reference stored in the pos1 variable is NULL and continue execution if the reference stored in the pos1 variable is not NULL.

The third statement above, "assert (pos1→z ( )==3);" can generate an error message if the z value of the pos struct, accessed via the accessor method pos1→z ( ), is not 3 and continue execution if the z value of the pos struct is 3. In this example, the pos struct was created an initialized using the above-mentioned "auto vec=createVec3 (fbb, 1, 2, 3)" statement as indicated above. A createVec3 (fbb, 1, 2, 3) call assigned the z value to 3, and this assignment can be verified using the third statement above. Note that if the createVec3 (fbb, 1, 2, 3) call was not made in this example, the pos struct would be initialized to a default value of NULL.

Similarly, we can next three example statements in a C-language-based programming language illustrate accessing elements of the inventory array of the Monster table:

```
auto inv = monster->inventory( );
assert(inv);
assert(inv->Get(9) == 9);
```

In these example statements, a call to the "inv→Get(9)" accessor method in the last statement immediately above uses zero based indexing to return a value of the $10^{th}$ item in the inv array. In this example, the inv array was initialized using the above-mentioned "unsigned char inv [ ]={0, 1, 2, 3, 4, 5, 6, 7, 8, 9};" statement, which in part, assigned the $10^{th}$ item of the inv array to a value of 9.

Using binary buffers with the generated header provides a low overhead use of data in a serialization buffer. There are however times to use text formats rather than binary formats; for example, because text is more commonly used with source control systems, to provide easy access to data, and/or have data/tools that use a text format, such as JSON.

The herein-described serialization techniques include functionality for at least two approaches for using text formats that have corresponding IDL schema. One approach is to use the above-mentioned compiler to convert the text-formatted data. Using the compiler does not require addition of new code to existing software using the text-formatted data program, and is efficient when using binary data. The disadvantage is that using the compiler requires an additional compilation pass. In some cases, the additional compilation step can be automated. Another approach is to add code capable of loading text directly to provide additional flexibility to the existing software.

In some cases, both compiler-based and software-based approaches can be used to operate on text-formatted data. For example, the software can check for both binary-formatted and text-formatted data. If only text formatted data is found, the binary format can be generated from the text format and corresponding IDL schema using a parser as necessary; otherwise, the software can load the binary-formatted data directly.

An example technique for using the parser can include loading text (either a schema or text-based format) to an in-memory buffer using a utility function of the herein-described serialization techniques. Then, a parser can be created by declaring an object of type Parser as provided by the herein-described serialization techniques. A call to a Parse ( ) method of the Parser object, such as Parse (fn), can be used to parse the file named fn, where the file stores either text-based formatted data or IDL schema.

The Parse ( ) method allows later-parsed files to reference definitions in earlier-parsed files. For example, one or more IDL schema files can be parsed first to populate the Parser object with definitions. Then after parsing the IDL schema file(s), one or more text-formatted data files can be parsed to use the populated definitions. The Parse ( ) can return a false value if parsing is unsuccessful and a true value if parsing is successful. If parsing is unsuccessful, a Parser member variable, Parser::err, can store a human readable error string having data for debugging parsing errors. After each text-formatted data file is parsed successfully, a Parser::fbb member variable, Parser::fbb, can store a binary version of a serialization buffer corresponding to the parsed text-formatted file.

Serialization Buffer Storage of IDL-Specified Schema

An example serialization buffer can be formatted as a binary file and in-memory format defined in terms of offsets and adjacency using the above-mentioned IDL schema. The serialization buffer format can start with an offset of type offset_t to the root object in the buffer, where offset_t is a generic offset type for the example serialization buffer. The offset_t type can be a type of an offset that refers to any IDL-specified entity; e.g., structs, tables, unions, strings, vectors, etc.

For example, offset_t can be a type referring to a 16-bit unsigned integer (uint16_t), a 32-bit unsigned integer (uint32_t), or another type. 16-bit and 32-bit offsets can be used to maintain binary compatibility between 32-bit and 64 bit systems. However, in applications that may overflow a 32-bit offset, a 64-bit (or larger) offset_t type can be utilized. An unsigned offset can indicate that an offset is a forward offset (towards a higher memory location) by default, and so a backwards offset can be explicitly marked as backwards (toward a lower memory location).

A table specified using an IDL schema can be represented using a virtual table and storage for data fields in the table that may include a reference to the virtual table. In some embodiments, the reference to the virtual table can be a signed offset having type s_offset_t (signed-type version of offset_t)—signed offsets can be used as references since virtual tables may be stored anywhere in memory). In the examples shown herein, offset_t can be a type referring to a 16-bit unsigned integer and soffset_t can be a type can be a type referring to a 32-bit signed integer.

A virtual table can be a list of offsets with one or more offsets per field in the table—virtual tables are discussed below in more detail in the context of FIGS. 1B, 1C, 3, 4, 5A, and 5B. Following the virtual table reference, data for all of the fields of the table can be stored; e.g., as aligned scalars. Unlike structs, not all fields of a table need to be present, as there is no predetermined order and layout. Rather, the order and layout of fields of a table can be specified using offsets in a virtual table associated with the table and the schema for the table.

In some embodiments, a serialization buffer for one or more instances of an object represented by a table can be stored in one contiguous block of memory. For example, the block of memory can start with storage for a virtual table for the object, followed by storage for each of the instances of the object. These embodiments allow storage to be conserved to store only one copy of the virtual table for all instances of the object. Further, as all serialization buffer data is contiguously stored in one block of memory, these embodiments allow all references from the virtual table to data stored for instances and all references from the data to the virtual table to be references within the serialization buffer. Thus, if the serialization buffer is copied, stored, and/or transmitted as a contiguous whole, the references within the serialization buffer will remain valid after copying, storage, and/or transmittal.

Regarding specific data types, such as vectors specified using IDL schema, can be stored as contiguous aligned scalar elements prefixed by a count. Then, a string is a vector of characters (e.g., each having type char) with null-termination. For example, the string "abc" can be represented as the following vector: 4abc\0, where 4 is a count of number of items in the vector, abc represents the characters in the string "abc", and \0 is a null value terminating the string as represented in the vector. In this example vector, the count equals 4 since there are 3 characters in "abc" and one additional null character "\0" in the vector.

In an example serialization buffer format, scalars of various sizes can each be aligned to their own size. Each scalar can be represented using little-endian format as commonly used by modern processing units. However, example serialization buffers can be used on big-endian formatted processing units with a slight performance penalty due to byte-swapping of data to convert the data to big-endian format. Then, an IDL struct can be stored as a collection of individual scalars, in order as declared in the schema, with each scalar aligned to its own size.

The example serialization buffer format allows flexibility in implementation; for example fields in a table can be stored in any order using the example serialization buffer format, and objects can be stored using the example serialization buffer format in a variety of orders. Flexibility in implementation is provided because the example serialization buffer format does not use a great deal of ordering information to be efficient. Further, such flexibility leaves room for optimization and extension—for example, fields can be packed in a way that is most compact.

The example serialization buffer format does not contain information for format identification and versioning. Rather, is a statically typed system, which implies that software using the example serialization buffers needs to account for what specific type of an example serialization buffer is being utilized. For dynamically typed systems, example serialization buffers can be wrapped inside other containers where needed. In some cases, unions can dynamically identify multiple possible sub-objects stored. Additionally, the example serialization buffer can be used together with the IDL schema parser if full reflective capabilities are desired.

Versioning is something that is intrinsically part of the example serialization buffer format as fields are all optional and additional fields can be readily added, so the format itself does not need a version number. If format breaking changes are needed, the new example serialization buffer format would become a new kind of format rather than just a version of a previous example serialization buffer format.

Example Methods of Operation

FIG. 2 is a flow chart of an example method 200. Method 200 can be carried out by one or more computing devices, such as, but not limited to, computing device 302, computing device 402, computing device 610, computing device 520, computing device 530, programmable device 604a, programmable device 604b, programmable device 604c, network 606, server device 608, computing device 700, computing cluster 709a, computing cluster 709b, and/or computing cluster 709c.

Method 200 can begin at block 210, where a computing device can generate an object in a serialization buffer stored in a memory of the computing device, as discussed above in the context of FIGS. 1B and 1C and as discussed below in the context of FIGS. 3, 4, 5A, and 5B. The object can be stored in the serialization buffer having a serialization buffer format. The serialization buffer format can specify one or more fields for storing data of the object and one or more offsets. An offset of the one or more offsets can correspond to a field of the one or more fields. An offset can refer to a storage location in the serialization buffer storing data for the corresponding field. The serialization buffer is configured so that data is accessible for a designated field of the object stored in the serialization buffer using the computing device by at least carrying out the procedures of blocks 212, 214, and 216.

At block 212, the computing device determines a designated offset of the one or more offsets corresponding to the designated field, as discussed above in the context of FIGS. 1B and 1C and as discussed below in the context of FIGS. 3, 4, 5A, and 5B.

At block 214, the computing device determines a starting location of the serialization buffer for storing data of the designated field, where the starting location is based on the designated offset, as discussed above in the context of FIGS. 1B and 1C and as discussed below in the context of FIGS. 3, 4, 5A, and 5B.

At block 216, the computing device provides access to data for the designated field stored in the serialization buffer starting at the starting location of the serialization buffer for storing data of the designated field, as discussed above in the context of FIGS. 1B and 1C and as discussed below in the context of FIGS. 3, 4, 5A, and 5B.

In some embodiments, the one or more offsets can be stored in a virtual table, and the one or more fields for storing data can include a virtual-table-reference field corresponding to a reference to the virtual table, as discussed above in the context of FIGS. 1B and 1C and discussed below in the context of FIGS. 3, 4, 5A, and 5B.

In particular of these embodiments, the serialization buffer can store a plurality of copies of the object, where the virtual table is stored once in the serialization buffer starting at a virtual-table location. Then, a copy of the object can store a reference to the virtual-table location in the virtual-table-reference field, as discussed below in the context of FIGS. 5A and 5B.

In other particular of these embodiments, the virtual table and the one or more fields for storing data are stored in the serialization buffer, and the designated field has a corresponding designated size. Then, providing access to data for the designated field stored in the serialization buffer starting at the starting location of the serialization buffer for storing data of the designated field can include: determining a data-field starting location in the memory for storing the one or more fields for storing data; determining a starting address for the virtual table using the virtual-table-reference field; determining the designated offset based on the starting address for the virtual table; determining the starting location of the serialization buffer for storing data of the designated field based on the data-field starting location and the designated offset; and providing access to data of the designated size in the memory starting at the starting location of the serialization buffer for storing data of the designated field, as discussed above in the context of FIGS. 3 and 4.

At block 220, a copy of the serialization buffer can be stored on a storage device associated with the computing device, where the copy of the serialization buffer is distinct from the serialization buffer, as discussed below in the context of FIGS. 5A and 5B.

In some embodiments, the storage device of the computing device is separate from the memory as discussed below in further detail in the context of at least FIGS. 5A and 5B.

In other embodiments, the computing device further comprises a communication interface configured for communicating with a second computing device. In these embodiments, method 200 can further include: sending the object from the computing device using the communication interface; and storing a received copy of the serialization buffer on the second computing device, as discussed below in further detail in the context of at least FIG. 4.

In still other embodiments, method 200 can further include the computing device retrieving the copy of the serialization buffer from the storage device, as discussed below in the context of FIGS. 5A and 5B. The copy of the serialization buffer can use the serialization buffer format. An offset of the one or more offsets of the copy of the serialization buffer can be the same as a corresponding offset of the one or more offsets of the serialization buffer. The copy of the serialization buffer can be configured so that data is accessible for the designated field of the object stored in the copy of the serialization buffer by the computing device by at least: determining the designated offset corresponding to the designated field; determining a starting location of the copy of the serialization buffer for storing data of the designated field, where the starting location is based on the designated offset and providing access to data for the designated field stored in the copy of the serialization buffer starting at the starting location of the copy of the serialization buffer for storing data of the designated field.

In particular of these still other embodiments, method 200 can further include: generating a modified-serialization-buffer format by modifying the serialization buffer format. The modified-serialization-buffer format can specify one or more modified fields for storing data of the object and can specify one or more modified offsets. An offset of the one or more modified offsets correspond to a field of the one or more modified fields. An modified offset of the one or more modified offsets can refer to a storage location in a modified serialization buffer storing data for the corresponding modified field. Then, the copy of the serialization buffer can be read into the modified serialization buffer arranged in the memory according to the modified-serialization-buffer format by at least: for at least one modified field of the one or more modified fields: determining whether the modified field corresponds to a corresponding field of the one or more fields of the serialization buffer format; after determining that the modified field corresponds to the corresponding field, copying data from the corresponding field of the copy of the serialization buffer into the modified field of the modified serialization buffer; otherwise, writing a default value for the modified field into the modified serialization buffer, such as discussed below in more detail in the context of at least FIGS. 5A and 5B.

Figure 5A:
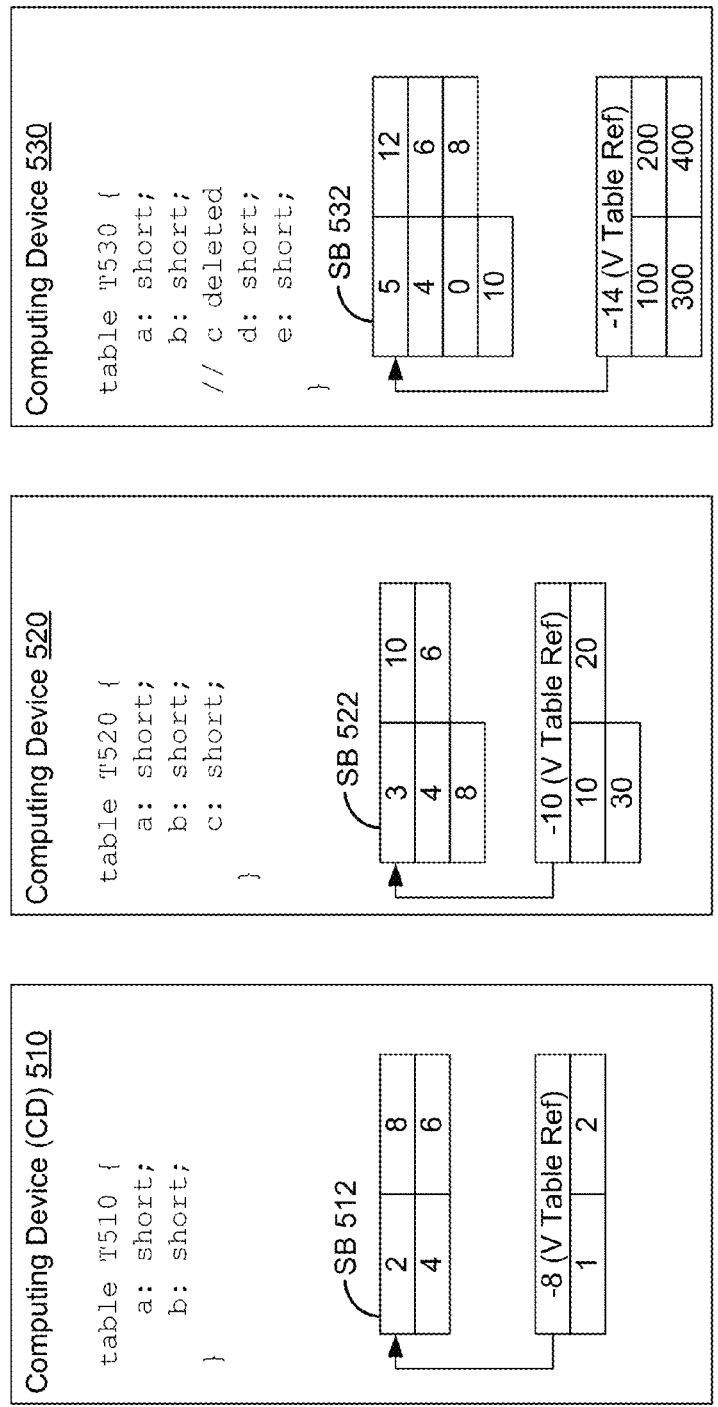

In more particular of these still other embodiments, determining whether the modified field corresponds to the corresponding field can include: determining a modified offset of the one or more modified offsets corresponding to the modified field; determining whether the modified offset of the one or more modified offsets equals a predetermined field-deletion value; and after determining that the modified offset of the one or more modified offsets equals the predetermined field-deletion value, determining that the modified field does not correspond to the corresponding field, such as discussed below in more detail in the context of at least FIGS. 5A and 5B.

Techniques for In-Place Access of Serialized Data

FIG. 3 depicts scenario 300 for generating data objects using a computing device, in accordance with an embodiment. In scenario 300, computing device 302 is configured with an IDL schema that includes a definition of a table named Test1. As shown in the upper-left-hand corner of FIG. 3, the Test1 table includes three fields: a, which is a short integer field, b, which is a floating point field, and d, which is a double length floating point field.

In scenario 300, computing device 302 can compile the IDL schema including Test1 to generate data definitions; e.g., as defined in a C++ header file related to the IDL schema. For example, if the IDL schema including the Test1 table is stored in a file named "Test1.idl", the compiler can generate a corresponding C++ header file; e.g., "Test1.h" with data definitions for using the herein-described serialization techniques.

Scenario 300 can continue with computing device 302 executing the software shown on the left hand side of FIG. 3. Comments in the software shown in FIG. 3 can be indicated by a "//" comment delimiter. Then, the first executable statement in the software is '#include "hdrpath/Test1.h"', which instructs computing device 302 to add the contents of the file "hdrpath/Test1.h" into the software. In scenario 300, the "hdrpath/Test1.h" file includes the data definitions generated by the IDL schema compiler as mentioned above. One of the data definitions includes specification a "BufferBuilder" type for a serialization buffer that stores data for the herein-described serialization techniques.

Then, computing device 302 executes the "BufferBuilder fbb" statement, which causes creation of a serialization buffer named "fbb" of type "BufferBuilder"—this creation statement includes creation of memory layout 310 for a virtual table for the Test1 table as defined in the previously-included "hdrpath/Test1.h" file. As shown in FIG. 3, memory layout 310 includes index 312 and field names 314—neither index 312 nor field names 314 is stored with the virtual table. Rather index 312 and field names 314 are shown in FIG. 3 for illustrative purposes only.

Memory layout 310 also includes virtual table data 316, which is stored in the fbb serialization buffer, and is shown without padding. Reading from left to right, virtual table data 316 can include a value indicating a number of fields represented by the virtual table, an object size for an instance of an object stored using the virtual table, and one or more offsets, with one offset per field represented using the virtual table. In the example shown in FIG. 3, virtual table data 316 shows that three fields are represented by the virtual table that correspond to the three fields in the IDL schema for the Test1 table, an object size of an object representing one instance of a Test1 table is eighteen bytes, and the offsets to data stored in the first, second, and third fields of the Test1 table; i.e., the a, b, and d fields, are respectively offsets of 4 bytes, 6 bytes, and 10 bytes.

The next three statements executed by computing device 302—short i=2; float f=3.0; double ee=−4.0; can define three respective variables: a short integer i initialized to a value of 2, a floating point number f initialized to a value of 3.0, and a double-sized floating point number ee initialized to a value of −4.0.

The next statement executed by computing device 302 during scenario 300 is "auto exloc=CreateTest1 (fbb, i, f, ee)". This statement defines a variable exloc that is assigned to store the output of a CreateTest1 ( ) function call. The CreateTest1 ( ) function can be created at time of compilation of the IDL schema file that includes the Test1 table and can be used to add an instance of the Test1 table to the fbb serialization buffer. CreateTest1 ( ) takes four parameters, as shown in FIG. 3: a parameter for serialization buffer and three parameters corresponding to the three fields in the Test1 table. In the specific example shown in FIG. 3, the serialization buffer parameter is "fbb", and the data for fields a, b, and d of the Test1 table is represented by the respective i, f, and ee parameters.

Execution of the CreateTest1 ( ) function can cause addition of data to the fbb serialization buffer as indicated by memory layout 320 that represents an instance of the Test1 table and returns a reference to the instance. As with memory layout 310, memory layout 320 includes index 322 which is not stored in the fbb serialization buffer. Rather, memory layout 320 includes storage for virtual table reference 324 and data for each of fields a, b, and d of an instance of the Test1 table, where padding is not shown in memory layout 320. Specifically, virtual table reference 324 is a four-byte field of type soffset_t as discussed above and refers backwards 10 bytes—the backward reference is indicated by use of a negative value for virtual table reference 324. That is, assuming contiguous storage of memory layouts 310 and 320, virtual table reference 324 points to the beginning of the virtual table specified by memory layout 310.

The data value of 2 for the a field of the Test1 table represented by memory layout 320 corresponds to the value of the i parameter used in the CreateTest1 ( ) function call. Similarly, the data values of 3.0 and −4.0 for the respective b and d fields of the Test1 table represented by memory layout 320 correspond to the respective values of the f and ee field parameter used in the CreateTest1 ( ) function call.

Scenario 300 continues with execution of four more statements by computing device 302:

```
short i2=22;
float f2=77.3;
double e2=−2.7e−145;
auto exloc2 = CreateTest1(fbb, i2, f2, e2);
```

The first three of these four statements define: a short integer variable i2 initialized to a value of 22, a floating point number variable f2 initialized to a value of 77.3, and a double-sized floating point number variable e2 initialized to a value of $2.7 \times 10^{-145}$. The fourth statement defines a variable exloc2 assigned to store the output of a CreateTest1 ( ) function call. In this specific example of a "CreateTest1 (fbb, i2, f2, e2)" function call, the parameters are: a serialization buffer parameter fbb, and i2, f2, and e2 parameters to be data for the respective a, b, and d fields of a newly-added instance of the Test1 table stored in the serialization buffer fbb.

Execution of the CreateTest1 ( ) function can cause addition of data to the fbb serialization buffer as indicated by memory layout 330a. Memory layout 330a includes index 332a which is not stored in the serialization buffer and also includes storage for virtual table reference 334a and data for each of fields a, b, and d for an instance of the Test1 table where padding is not shown in either memory layout 330a or 330b. Specifically, virtual table reference 334a refers backwards 28 bytes—the backward reference is indicated by use of a negative value for virtual table reference 334a. That is, assuming contiguous storage of memory layouts 310, 320, and 330a, the exloc instance stored using memory layout 320 occupies 18 bytes immediately prior to virtual table reference 334a, and the virtual table stored immediately prior to the exloc instance occupies 10 bytes, and so virtual table reference 334a refers to the beginning of the virtual table specified by memory layout 310.

The data value of 22 for the a field of the Test1 table represented by memory layout 320 corresponds to the value of the i2 parameter used in the CreateTest1 ( ) function call. Similarly, the data values of 77.3 and $2.7 \times 10^{-145}$ for the respective b and d fields of the Test1 table represented by memory layout 330a correspond to the respective values of the f2 and e2 field parameter used in the CreateTest1 ( ) function call.

Scenario 300 continues with execution of two more statements that create two respective temporary variables. The "float temp" statement creates an uninitialized temporary floating point variable named temp and the "double dtemp" statement creates an uninitialized temporary floating point variable named dtemp.

Then, as indicated in FIG. 3, scenario 300 continues with execution of an if statement: "if (exloc2→a ( )>20)". The "exloc2→a( )" portion of this statement involves a call to an accessor method a ( ). Accessor method a ( ) can access the a field of the Test1 table instance referred to by the exloc2 variable as follows:

1. The exloc2 reference is assumed to refer to the beginning of the instance; that is referring to the first byte of virtual table reference 334a. Virtual table references are assumed to be of type soffset_t and so are signed integers with 4 bytes. Virtual tables are assumed to have the following layout (shown in FIG. 3 and discussed above): a number of fields stored in a 2 byte value, an object size stored in a 2 byte value, and one or more offsets, each stored in a two byte value; e.g., of type offset_t, stored in the order indicated by the IDL schema for data represented using the virtual table.

2. Four bytes for a soffset_t value can be read from virtual table reference 334a to get a value of −28. This value of −28 can be added to exloc2 value to obtain a starting address of virtual table data 316.

3. When the accessor method a( ) was generated by the compiler, the IDL schema indicated that the a field was the first field of the Test1 table. Then, the accessor method a ( ) can go forward four bytes from the starting address of virtual table data 316 (to skip the number of fields and object size data items) to access the first offset value, which corresponds to the first field of the Test1 table. As shown in FIG. 3, the first offset value is 4.

4. The first offset value of 4 can be added to the starting address of exloc2 to obtain the starting address of the a field of the Test1 table instance that is referred to by exloc2.

5. The IDL schema for Test1 indicates that a is a short integer which has a size of two bytes. Then, the next two bytes from the starting address of the a field can be read, as those two bytes hold the value of the a field of the Test1 table instance referred to by the exloc2 variable. As shown in memory layout 330a of FIG. 3, a has the value 22.

6. The accessor method call "exloc2→a( )" returns the value 22.

Similar techniques can be used for accessor methods b ( ) and d ( ). For example, accessor methods a ( ) and b ( ) (or d ( )) can generally perform the same tasks. However, in task #3 above, accessor method b ( ) (or d ( )) would go forward six (or eight) bytes to find the second (or third) offset in virtual table data 316 as b (or d) is the second (or third) field in the Test1 table. Then, accessor method b ( ) (or d ( )) would use the second (or third) offset rather than the first offset discussed above for accessor method a ( ). Further, in task #5 above, as field b is of type float (or field d is of type double), accessor method b ( ) would read 4 bytes which is the size of a float to obtain the value of b (or accessor method d ( ) would read 8 bytes which is the size of a double to obtain the value of d).

As 22 is greater than 20, the body of the if statement is executed during scenario 300. The body of the if statement includes the following four statements:

```
temp = exloc2->a( )*1.8+32;
exloc2->Setb(temp);
dtemp = exloc2->b( )*1e+100;
exloc2->Setd(dtemp);
```

The first of the four statements in the body of the if statement "temp=exloc2→a ( )*1.8+32;" takes the value 22, which is the value returned by the accessor method call "exloc2→a( )" as discussed above, multiplies that value by 1.8 and adds 32 to the result, for a final value of 71.6 that is stored in the temp temporary variable.

The second statement in the body of the if statement "exloc2→Setb (temp);" is a call to a method "Setb" that sets the value of the b field of the instance of the Test1 table referred to by exloc2 to a value of its parameter, temp. As such, the Setb method sets the b field of the exloc2 instance of the Test1 table to 71.6.

The Setb (newb) method can change the data for the b field of the Test1 table instance referred to by the exloc2 variable to have the value of the newb parameter as follows:

1. As with accessor method a ( ) the exloc2 reference is assumed to refer to the beginning of the instance, virtual table references are assumed to be of type soffset_t and so are signed integers with 4 bytes, and virtual tables are assumed to have the same layout as discussed above in the context of task #1 of accessor method a ( ).

2. Four bytes for a soffset_t value can be read from virtual table reference 334a to get a value of −28. This value of −28 can be added to exloc2 value to obtain a starting address of virtual table data 316.

3. When the method Setb( ) was generated by the compiler, the IDL schema indicated that the b field was the second field of the Test1 table. Then, method Setb( ) can go forward six bytes from the starting address of virtual table data 316 (to skip the number of fields and object size data items as well as the first offset) to access the second offset value, which corresponds to the second field of the Test1 table. As shown in FIG. 3, the second offset value is 6.

4. The second offset value of 6 can be added to the starting address of exloc2 to obtain the starting address for the b field of the Test1 table instance that is referred to by exloc2.

5. The IDL schema for Test1 indicates that b is a floating point number, which has a size of four bytes. Then, the four bytes of the serialization buffer starting at the starting address of the b field can be overwritten by the value of the parameter newb. At this stage of scenario 300, the newb parameter has the value of the temp variable, which equals 71.6. As shown in updated memory layout 330b of FIG. 3, the updated value of b is 71.6.

Similar techniques can be used for methods Seta ( ) and Setd ( ) to set the respective a and d field values of the Test1 table. For example, methods Setb (newb) and Seta (newa) (or Setd (newd)) can generally perform the same tasks. However, in task #3 above, method Seta ( ) (or Setd ( ) would go forward four (or eight) bytes to find the first (or third) offset in virtual table data 316 as a (or d) is the first (or third) field in the Test1 table. Then, Seta ( ) (or Setd ( )) would use the first (or third) offset rather than the second offset discussed above for method Setb ( ). Further, in task #5 above, as field a is of type short (or field d is of type double), method Seta ( ) would write 2 bytes (the size of a short) from its parameter newa into the serialization buffer referred to by exloc2 (or method Setd ( ) would write 8 bytes (the size of a double) from its parameter newd into the serialization buffer referred to by exloc2).

The third statement in the body of the if statement "dtemp=exloc2→b ( )*1e+100;" takes the value 71.6, which is the value returned by the accessor method call "exloc2→b( )" after the b field was set to 71.6 as part of the previous statement discussed above, and multiplies that value by $10^{100}$ to get a value of $7.16 \times 10^{101}$ that is stored in the dtemp temporary variable.

The fourth statement in the body of the if statement "exloc2→Setd (dtemp);" is a call to a method "Setd" that sets the value of the d field of the instance of the Test1 table referred to by exloc2 to a value of its parameter, dtemp. As such, the Setd method sets the d field of the exloc2 instance of the Test1 table to $7.16 \times 10^{101}$. The updates performed by the body of the if statement are shown by updated memory layout for exloc2 330b, where values changed from memory layout for exloc2 330a are indicated using bold values. In particular, the values of the b and d fields of the exloc2 instance of the Test1 table have been updated to respective values of 71.6 and $7.16 \times 10^{101}$ as discussed immediately above. After execution of the body of the if statement, scenario 300 can end with serialization buffer fbb storing two instances of the Test1 table: one instance represented by memory layout 320 and another instance represented by updated memory layout 330b.

The format of serialization buffers represented in FIG. 3 is optimized for reading from a file, a network, or some other location/medium. The serialization buffer format also enables works well with streaming, where one object can be read at a time as part of a stream of objects. If streamed objects are processed in standard depth first order, the current file pointer of the stream refers to the next object. Doing a sparse traversal of serialization buffer format can be performed efficiently on files by seeking forward to skip entire instances of tables, structs, etc. Randomly accessing of instances and/or data within a serialization buffer is possible, with random access likely being faster in memory compared to randomly accessing a serialization buffer stored in a file or provided via a network connection.

As indicated above in scenario 300, modifying of fields with basic types can involve about the same amount of overhead as reading fields with basic types. More complex modifications, such as string and list size changes or adding/removing fields, can be supported but may incur additional overhead.

Writing multiple instances of data into a serialization buffer can be performed using the following example approach:

Generate the data to be written D in a depth-first, preorder traversal. For example, the table can be conceived of as a tree, with data fields directly defined in the table (e.g., shorts, floats) as being leaf nodes directly below the root of the tree, and more complex structures (e.g., strings, vectors, sub-tables) being nodes having additional depth below the root. Then, for in-order traversal, fields can be traversed as ordered in the IDL schema.

For each struct or table to be written in D, specify the type of struct or table, and what fields of this struct or table that are to be written as part of D; e.g. using a bit field or other data sub-structure. This allows the entire struct to be allocated for D, except for substructures that can be allocated after the field is written.

The struct or table values can be filled in for D.

Once D is generated, D can be written to the serialization buffer.

Other approaches are possible as well.

This depth-first write approach is relatively fast, and allows the data to be written to be generated without any memory copies or moves. In general, though, to ensure correctness, all data for D has to be generated before D can be written to the serialization buffer.

Figure 4:
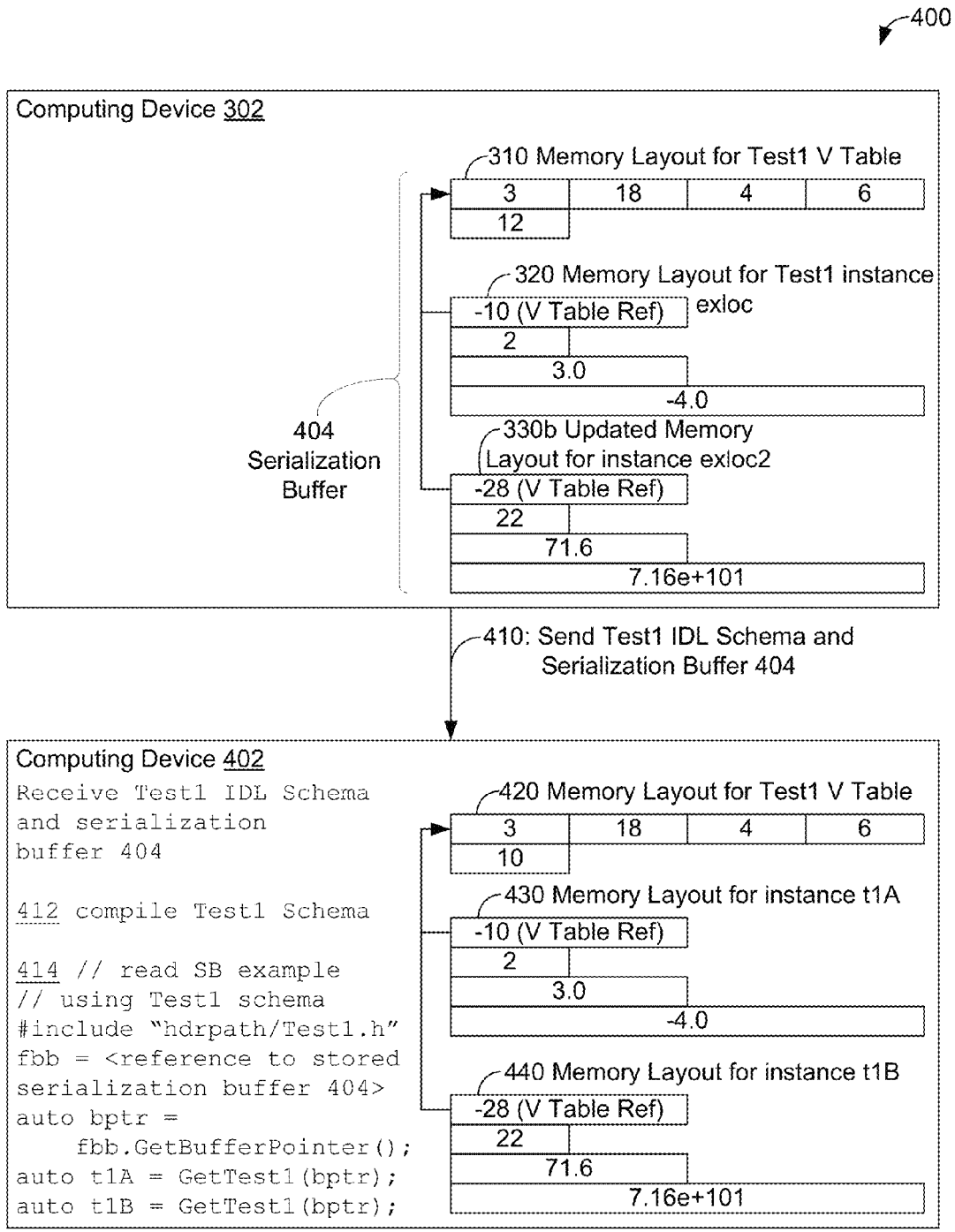
FIG. 4 depicts a scenario for communicating data objects between two computing devices using serialization buffers, in accordance with embodiment.

FIG. 4 depicts scenario 400 for communicating data objects between two computing devices using serialization buffers, in accordance with an embodiment. Scenario 400 begins at the end of scenario 300, with computing device 300 having generated serialization buffer 404. As shown in FIG. 4, serialization buffer 404 includes a virtual table for a Test1 table specified in memory layout 310, and two instances of the Test1 table as specified in respective memory layouts 320 and 330b. Note that in FIG. 4, padding is not shown for any of the memory layouts or serialization buffers—the memory layouts and/or serialization buffers of scenario 400 may be padded depending on an underlying computer architecture.

Scenario 400 continues at 410 with computing device 302 sending an IDL schema with a specification of Test1 table and serialization buffer 404 to computing device 402. Recall that Test1 table is specified using IDL as shown in FIG. 3 as follows:

```
table Test1
{
    a: short;
    b: float;
    d: double;
}
```

Scenario 400 continues with computing device 402 receiving the IDL schema including the specification of Test1 table as well as serialization buffer 404. At 412, as indicated in the lower-left portion of FIG. 4, computing device 402 compiles the IDL schema that includes the specification of Test1 table. Compilation of IDL schema is discussed above in more detail at least in the context of FIG. 3.

At 414, as indicated in the lower-left portion of FIG. 4, computing device 402 executes software to read in serialization buffer (SB) 404. In scenario 400, serialization buffer 404 is stored The software includes five statements:

```
#include "hdrpath/Test1.h"
fbb = <pointer to stored serialization buffer 404>
auto bptr = fbb.GetBufferPointer( );
auto t1A = GetTest1(bptr);
auto t1B = GetTest1(bptr);
```

The first executable statement of the statements above is '#include "hdrpath/Test1.h"', which instructs computing device 402 to add the contents of the file "hdrpath/Test1.h" into the software as discussed above in more detail in the context of FIG. 3.

In scenario 400, the variable "fbb" stores a reference to stored serialization buffer 404; e.g., fbb can store a pointer to the beginning of a memory buffer storing the copy of serialization buffer 404 received at computing device 402, a file pointer to a file storing the copy of serialization buffer 404, or some other reference to the copy of serialization buffer received at computing device 402.

The next executable statement "auto bptr=fbb.GetBufferPointer ( );" creates a variable, bptr, that is initialized using the GetBufferPointer ( ) method of the fbb variable to point to serialization buffer 404 received at computing device 402.

Each of the next two statements "auto t1A=GetTest1 (bptr); auto t1B=GetTest1 (bptr);" creates a variable that is initialized to refer to an instance of Test1 table using the GetTest1( ) function, which takes the buffer pointer variable "bptr" as a parameter. Execution of the first of these two statements "auto t1A=GetTest1 (bptr);" creates a variable t1A that points to the first instance of Test1 table stored in the serialization buffer; e.g., the instance specified using memory layout 430 as shown in FIG. 4, which is the same as the instance referred to by the "exloc" variable of scenario 300. Execution of the second statement "auto t1B=GetTest1 (bptr);" creates a variable t1B that points to the second instance of Test1 table stored in the serialization buffer; e.g., the instance specified using memory layout 440 as shown in FIG. 4, which is the same as the instance referred to by the "exloc2" variable of scenario 300.

After completion of the "auto t1B=GetTest1 (bptr);" statement, scenario 300 can be completed.

FIGS. 5A and 5B together depict scenario 500 for communicating data objects having different formats among three computing devices using serialization buffers, in accordance with an embodiment. In scenario 500, an IDL schema to specify a table T510 is generated on computing device 510 and compiled. The IDL schema for table T510 is provided to computing device 520, where the IDL schema is modified to create a specification for a table T520 and the specification for table T510 is removed from the schema. The schema for table T520 is provided to computing device 530, where the IDL schema is modified to create a specification table for a table T530 and the specification for table T520 is removed from the IDL schema.

The schema for table T510 on computing device 510 is shown in FIG. 5A as:

```
table T510 {
    a: short;
    b: short;
}
```

The schema for table T520 on computing device 510 is shown in FIG. 5A as:

```
table T520 {
    a: short;
    b: short;
    c: short;
}
```

The schema for table T530 on computing device 510 is shown in FIG. 5A as:

```
table T530 {
    a: short;
    b: short;
    // c deleted
    d: short;
    e: short;
}
```

Scenario 500 continues with each schema being compiled on each respective computing device and an instance of each table being generated as shown in FIG. 5A. FIG. 5A shows that computing device 510 has generated serialization buffer 512 with a virtual table for table T510 having two fields, an object size of 8 bytes, and two offsets for fields a and b with the respective offsets being 4 and 6 bytes. Note that in FIGS. 5A and 5B, padding is not shown for any serialization buffer, but serialization buffers of scenario 500 may be padded depending on the underlying computer architecture.

The instance of table T510 stored in serialization buffer 512 has a virtual table reference pointing to the beginning the virtual table in serialization buffer 512 (that is backwards 8 bytes, assuming the virtual table is stored contiguously with the instance of table T510) and data values 1 and 2 for respective fields a and b.

FIG. 5A shows that computing device 520 has generated serialization buffer 522 with a virtual table for table T520 having three fields, an object size of 10 bytes, and three offsets for fields a, b, and c with the respective offsets of 4, 6, and 8 bytes. The instance of table T520 stored in serialization buffer 522 has a virtual table reference pointing to the beginning the virtual table in serialization buffer 512 (that is backwards 10 bytes, assuming the virtual table is stored contiguously with the instance of table T520) and data values 10, 20, and 30 for respective fields a, b, and c.

FIG. 5A shows that computing device 530 has generated serialization buffer 532 with a virtual table for table T530 having five fields, an object size of 12 bytes, and five offsets for fields a, b, c, d, and e with the respective offsets of 4, 6, 0, 8, and 10 bytes. The offset of 0 bytes corresponding to field c of table T530 indicates that the field has been deleted.

The instance of table T530 stored in serialization buffer 532 has a virtual table reference pointing to the beginning the virtual table in serialization buffer 532 (that is backwards 14 bytes, assuming the virtual table is stored contiguously with the instance of table T530) and data values 100, 200, 300, and 400 for respective fields a, b, d, and e and where no data is stored for deleted field c.

Scenario 500 continues at 540 where each of computing devices 510, 520, and 530 writes their respective serialization buffers to respective files. In scenario 500, computing device 510 writes a file named T510 that contains a copy of serialization buffer SB 512, computing device 520 writes a file named T520 that contains a copy of serialization buffer SB 522, and computing device 530 writes a file named T530 that contains a copy of serialization buffer SB 532.

Each of the respective files can be stored on a storage device. The storage device can be distinct from the memory of a computing device, and can provide persistent storage; that is, storage that continues on after the memory of the computing device is cleared; e.g., after the computing device is powered down. Example storage devices include, but are not limited to, flash drives, flash memories, magnetic disks, magnetic drives, compact disks, magnetic tape, and remotelyaccessible storage devices. The storage device can be associated with and/or a component of computing device 510, 520, or 530.

In scenario 500, each of computing devices 510, 520, and 530 has its own storage device. Then, file T510 can be stored on the storage device for computing device 510, file T520 can be stored on the storage device for computing device 520, and file T530 can be stored on the storage device for computing device 530. Other example of storing files T510, T520, and T530 are possible as well.

At 542, each of computing devices 510, 520, and 530 interchanges the serialization buffer files; that is, at the end of 542, each of computing devices 510, 520, and 530 has its own copy of each of files T510, T520, and T530. For example, to interchange file T510, computing device 510 can send copies of file T510 to each of computing devices 520 and 530, and then each of computing devices 520 and 530 can store its respective copy of file T510; e.g. on a storage device associated with the computing device as discussed above in the context of block 540. A similar procedure can be used by computing devices 520 and 530 to interchange respective files T520 and T530. Other techniques for interchanging files are possible as well.

In some scenarios, SB 512, SB 522, and/or SB 532 is cleared from the memory of respective computing device 510, 520, and/or 530 after block 540 or after block 542. That is, after SB 512, SB 522, and/or SB 532 is written to their respective files, SB 512, SB 522, and/or SB 532 may be cleared from the memory of respective computing device. The memory of computing device 510, 520, and 530 can be cleared of respective SBs 512, 522, and 532 by permanently removing a process, thread, or similar execution object that controls a respective SB from the memory, removing and then restoring power to a respective computing device, by rebooting the respective computing device, and/or by another technique for clearing an SB from memory.

Continuing to FIG. 5B, scenario 500 continues at 544 with each of computing devices 510, 520, and 530 reading the serialization buffer files in this order: T510, T520, and T530. Recall that each computing device had compiled different IDL schema for formatting these serialization buffer files; that is, computing device 510 compiled an IDL schema defining table T510, computing device 520 compiled an IDL schema defining table T520, and computing device 530 compiled an IDL schema defining table T530.

As such, computing device 510 can read each of the T510, T520, and T530 files using functions generated with respect to the schema for table T510 and generate serialization buffer 550. Serialization buffer 550 includes virtual table 552 generated to read a two-field table, with each object instance being 8 bytes in length and having an offset of 4 to the first of the two fields (a) and an offset of 6 to the second of the two fields (b). Then, instance 554 can be generated by reading the T510 file to obtain data values 1 and 2 for the respective a and b fields of table T510, instance 556 can be generated by reading the T520 file to obtain data values 10 and 20 for the respective a and b fields of table T510, and instance 558 can be generated by reading the T530 file to obtain data values 100 and 200 for the respective a and b fields of table T510.

Computing device 520 can read each of the T510, T520, and T530 files using functions generated with respect to the schema for table T520 and generate serialization buffer 560. Serialization buffer 560 includes virtual table 562 generated to read a three-field table, with each object instance being 10 bytes in length and having an offset of 4 to the first of the three fields (a), an offset of 6 to the second of the three fields (b), and an offset of 8 to the third of the three fields (c). Then, instance 564 can be generated by reading the T510 file to obtain data values 1 and 2 for the respective a and b fields of table T520 with a default value of 0 provided for the missing c field, instance 566 can be generated by reading the T520 file to obtain data values 10, 20, and 30 for the respective a, b, and c fields of table T520, and instance 568 can be generated by reading the T530 file to obtain data values 100 and 200 for the respective a and b fields of table T520. The c or third field of table T520 has been deleted in the schema for table T530, and therefore has a zero offset (as shown in the virtual table for serialization buffer 532). Thus, no data is present for the c field of table T520 in the T530 file, and so the c field is assigned to a default value of 0 for instance 568.

Computing device 530 can read each of the T510, T520, and T530 files using functions generated with respect to the schema for table T530 and generate serialization buffer 570. Serialization buffer 570 includes virtual table 572 generated to read a five-field table, with each object instance being 12 bytes in length and having an offset of 4 to the first of the five fields (a), an offset of 6 to the second of the five fields (b), an offset of 0 to the third of the five fields (c) as the third field has been deleted from the schema for table T530, an offset of 8 to the fourth of the five fields (d), and an offset of 10 to the fifth of the five fields (e). Then, instance 574 can be generated by reading the T510 file to obtain data values 1 and 2 for the respective a and b fields of table T520 with a default values of 0 provided for the missing d and e fields, instance 576 can be generated by reading the T520 file to obtain data values 10 and 20 for the respective a and b fields of table T530 with a default values of 0 provided for the missing d and e fields. The schema for table T520 as written to the T520 file provides data in three fields; however, the schema for table T530 indicates the c or third field has been deleted, and so the data for the d and e (or the fourth and fifth) fields of table T520 is missing from the T520 file. Instance 578 can be generated by reading the T530 file to obtain data values 100, 200, 300, and 400 for the respective a, b, d, and e fields of table T530.

Scenario 500 indicates that the use of IDL schema specifying all-optional fields for tables and using default values for missing fields can enable forward and backward compatibility for serialization buffers. In scenario 500, the first version of the schema for table T510 was used on computing device 510, modified on computing device 520 to create a second version of the schema using table T520, and further modified on computing device 530 to create a third version of the schema using table T530.

In scenario 500, the first version of the schema can be considered as an oldest, or backward, version of the schema, the third version of the schema can be considered as a newest, or forward, version of the schema, and the second version of the schema can be considered to be a forward version of the schema defining table T510 and a backward version of the schema defining table T530. Also, in scenario 500, the first version of the schema was compiled on computing device 510 to read in serialization buffers created using both the first schema and forward versions of the first schema, indicating that software and serialization buffers generated using software based on compiled IDL schema are backwards compatible with new values discarded to generate synchronization buffer 550.

In scenario 500, the second version of the schema was compiled on computing device 520 to read in serialization buffers created using a backwards version of the second schema, the second schema, and a forwards version of the second schema, indicating that software and serialization buffers generated using software based on compiled IDL schema are both backwards and forwards compatible to generate synchronization buffer 560. In this case, missing values are set to reasonable defaults (e.g., the value 0 for a short not present in the T510 file but expected in by the format of table T520 used on computing device 520). Further, the third version of the schema was compiled on computing device 530 to read in serialization buffers created using backwards versions of the third schema and using the thirds schema, indicating that software and serialization buffers generated using software based on compiled IDL schema are forwards compatible to generate synchronization buffer 570. In this case, missing values are set to reasonable defaults (e.g., the value 0 is used for each shorts not present in the T510 and T520 files but expected in by the format of table T530 used on computing device 520).

After each of three computing devices 510, 520, and 530 has generated its respective synchronization buffer 550, 560, and 570, scenario 500 can end.

Example Data Network

Figure 6:
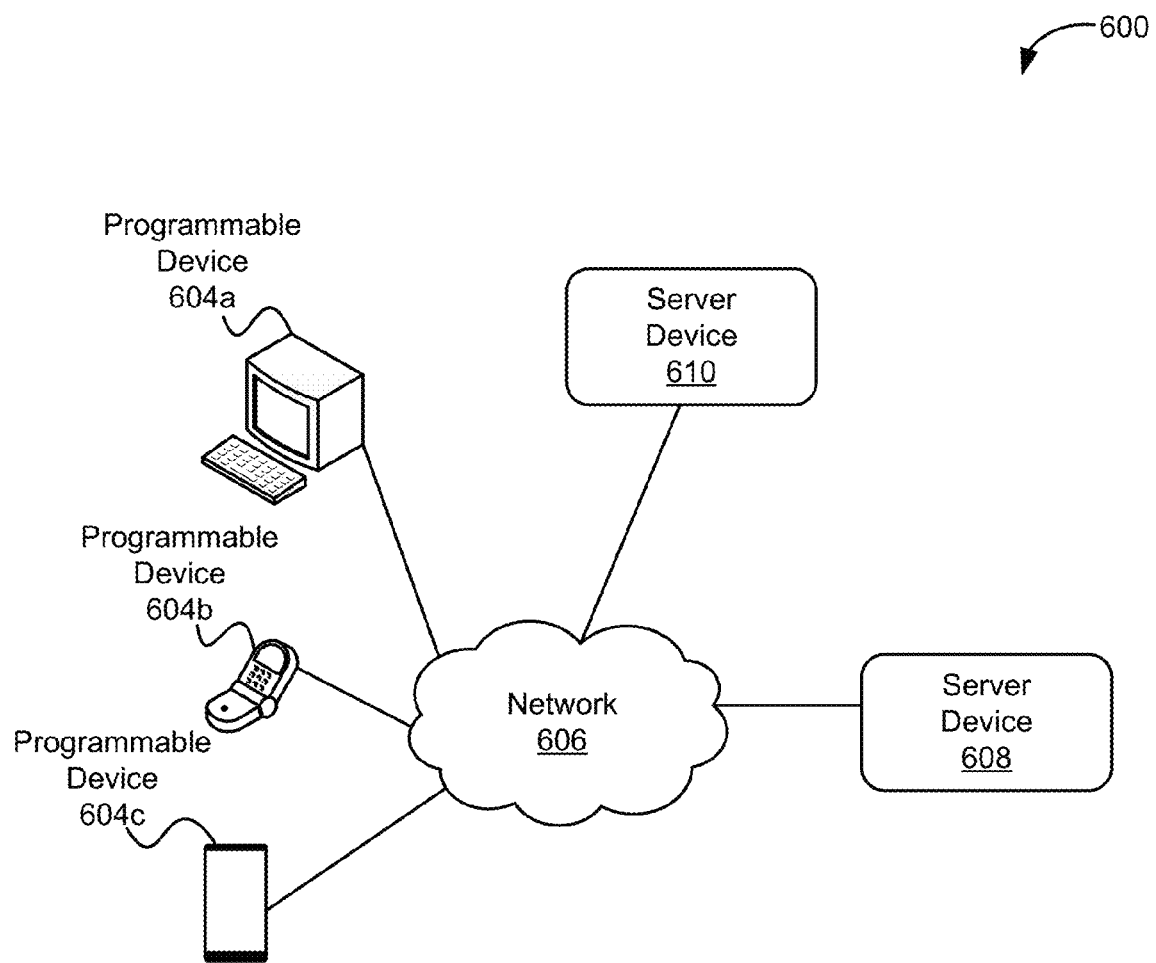
FIG. 6 depicts a distributed computing architecture, in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
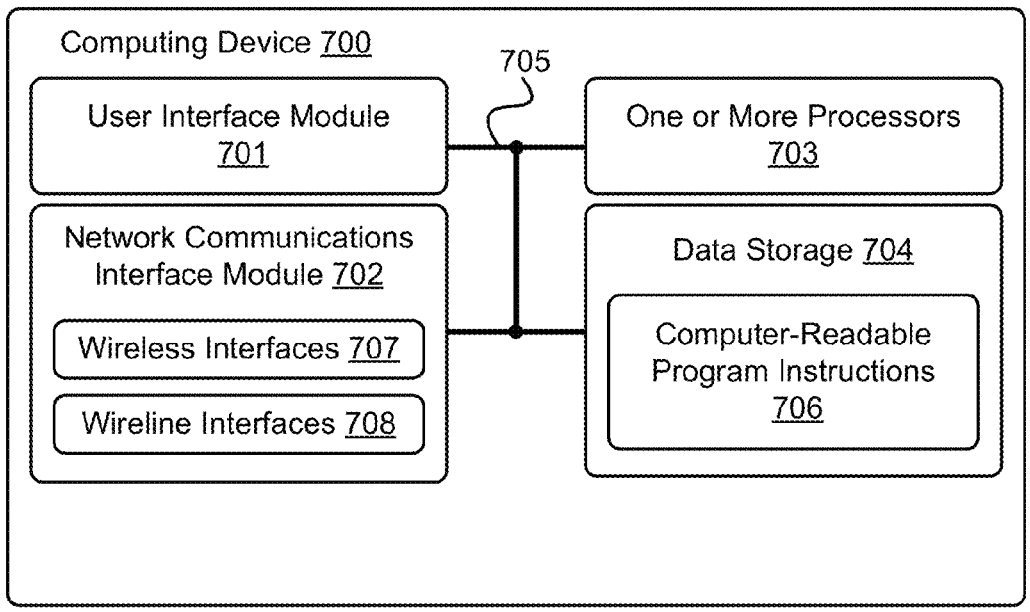
FIG. 7A is a block diagram of a computing device, in accordance with an example embodiment.

FIG. 7A is a block diagram of a computing device (e.g., system) in accordance with an example embodiment. In particular, computing device 700 shown in FIG. 7A can be configured to perform one or more functions of computing device 202, computing device 302, computing device 410, computing device 420, computing device 430, programmable device 604a, programmable device 604b, programmable device 604c, network 606, and/or server device 608. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices. The one or more computer-readable storage media can be, or can include, one or more non-transitory computer-readable storage media.

Data storage 704 can include computer-readable program instructions 706 and perhaps additional data, such as but not limited to one or more serialization buffers, virtual tables, objects, and/or instances of objects. In some embodiments, data storage 704 can additionally include storage required to perform at least part of the herein-described methods and techniques and/or at least part of the functionality of the herein-described devices and networks.

Cloud-Based Servers

Figure 7B:
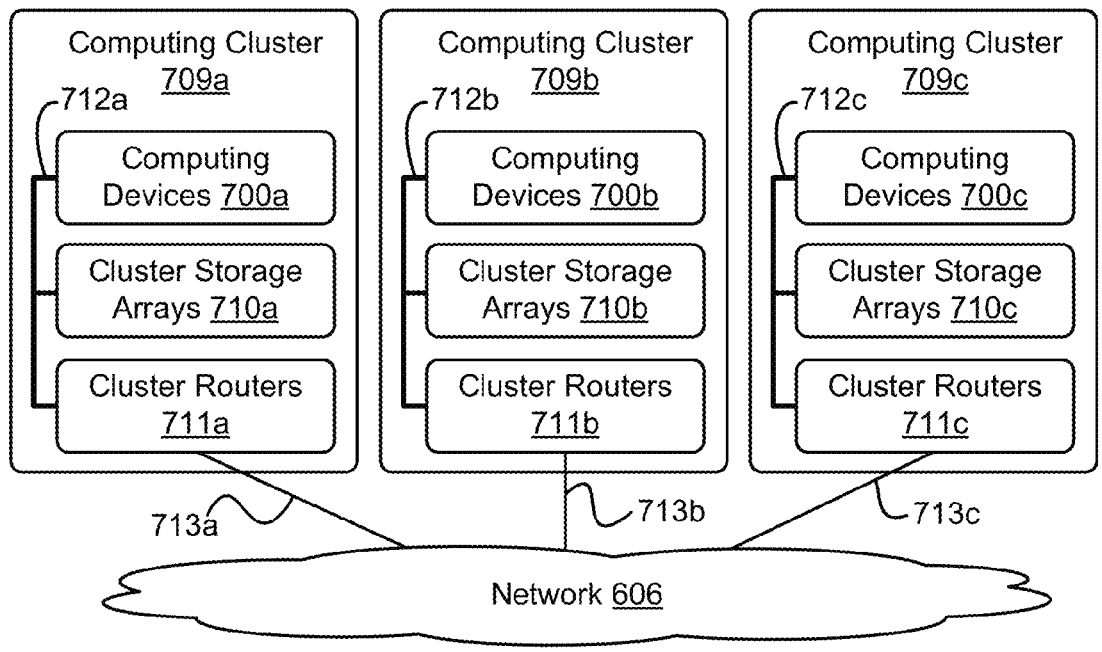
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604a, 604b, and 604c, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of server 608. In one embodiment, the various functionalities of server 608 can be distributed among one or more computing devices 700a, 700b, and 700c. Computing devices 700b and 700c in respective computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server devices 608 and/or 610 can be distributed across computing devices 700a, 700b, and 700c based at least in part on the processing requirements of server devices 608 and/or 610, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 710a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
    generating an object in a serialization buffer stored in a memory of a computing device, the object as stored in the serialization buffer having a serialization buffer format, wherein the serialization buffer format specifies one or more fields for storing data of the object and one or more offsets, wherein an offset of the one or more offsets corresponds to a field of the one or more fields, wherein an offset of the one or more offsets refers to a storage location in the serialization buffer storing data for the corresponding field, and wherein the serialization buffer is configured so that data is accessible for a designated field of the object stored in the serialization buffer using the computing device by at least:
        determining a designated offset of the one or more offsets corresponding to the designated field,
        determining a starting location of the serialization buffer for storing data of the designated field, wherein the starting location is based on the designated offset, and
        providing access to data for the designated field stored in the serialization buffer starting at the starting location of the serialization buffer for storing data of the designated field;
    storing a copy of the serialization buffer on a storage device associated with the computing device, wherein the copy of the serialization buffer is distinct from the serialization buffer;
    generating a modified-serialization-buffer format by modifying the serialization buffer format, wherein the modified-serialization-buffer format specifies one or more modified fields for storing data of the object and one or more modified offsets, wherein an offset of the one or more modified offsets corresponds to a field of the one or more modified fields, and wherein a modified offset of the one or more modified offsets refers to a storage location in a modified serialization buffer storing data for the corresponding modified field; and
    reading the copy of the serialization buffer into the modified serialization buffer arranged in the memory according to the modified-serialization-buffer format by at least:
        for at least one modified field of the one or more modified fields:
            determining whether the modified field corresponds to a corresponding field of the one or more fields of the serialization buffer format;
            after determining that the modified field corresponds to the corresponding field, copying data from the corresponding field of the copy of the serialization buffer into the modified field of the modified serialization buffer; and
        otherwise, writing a default value for the modified field into the modified serialization buffer.

2. The method of claim 1, wherein the one or more offsets are stored in a virtual table, and wherein the one or more fields for storing data comprise a virtual-table-reference field corresponding to a reference to the virtual table.

3. The method of claim 2, wherein the serialization buffer stores a plurality of copies of the object, wherein the virtual table is stored once in the serialization buffer starting at a virtual-table location, and wherein a copy of the object stores a reference to the virtual-table location in the virtual-table-reference field.

4. The method of claim 2, wherein the virtual table and the one or more fields for storing data are stored in the serialization buffer, wherein the designated field has a corresponding designated size, and wherein providing access to data for the designated field stored in the serialization buffer comprises:
  determining a data-field starting location in the memory for storing the one or more fields for storing data;
  determining a starting address for the virtual table using the virtual-table-reference field;
  determining the designated offset based on the starting address for the virtual table;
  determining the starting location of the serialization buffer for storing data of the designated field based on the data-field starting location and the designated offset; and
  providing access to data of the designated size in the memory starting at the starting location of the serialization buffer for storing data of the designated field.

5. The method of claim 1, wherein the storage device of the computing device is distinct from the memory.

6. The method of claim 1, wherein the computing device further comprises a communication interface configured for communicating with a second computing device, and wherein the method further comprises:
  sending the serialization buffer from the computing device using the communication interface.

7. The method of claim 1, further comprising:
  retrieving the copy of the serialization buffer from the storage device using the computing device, wherein the copy of the serialization buffer uses the serialization buffer format, wherein an offset of the one or more offsets of the copy of the serialization buffer is the same as a corresponding offset of the one or more offsets of the serialization buffer, and wherein the copy of the serialization buffer is configured so that data is accessible for the designated field of the object stored in the copy of the serialization buffer using the computing device by at least:
    determining the designated offset corresponding to the designated field,
    determining a starting location of the copy of the serialization buffer for storing data of the designated field, wherein the starting location is based on the designated offset, and
    providing access to data for the designated field stored in the copy of the serialization buffer starting at the starting location of the copy of the serialization buffer for storing data of the designated field.

8. The method of claim 1, wherein the serialization buffer is is stored in one contiguous block of memory, and wherein the one or more offsets refer to one or more memory locations within the one contiguous block of memory.

9. The method of claim 1, wherein determining whether the modified field corresponds to the corresponding field comprises:
  determining a modified offset of the one or more modified offsets corresponding to the modified field;
  determining whether the modified offset of the one or more modified offsets equals a predetermined field-deletion value; and
  after determining that the modified offset of the one or more modified offsets equals the predetermined field-deletion value, determining that the modified field does not correspond to the corresponding field.

10. A computing device, comprising:
  a storage device;
  a processor; and
  a tangible computer readable medium configured to store at least executable instructions, wherein the executable instructions, when executed by the processor, cause the computing device to perform functions comprising:
    generating an object in a serialization buffer stored in the tangible computer readable medium, the object as stored in the serialization buffer having a serialization buffer format, wherein the serialization buffer format specifies one or more fields for storing data of the object and one or more offsets, wherein an offset of the one or more offsets corresponds to a field of the one or more fields, wherein an offset of the one or more offsets refers to a storage location in the serialization buffer storing data for the corresponding field, and wherein the serialization buffer is configured so that data is accessible for a designated field of the object stored in the serialization buffer using the computing device by at least:
      determining a designated offset of the one or more offsets corresponding to the designated field,
      determining a starting location of the serialization buffer for storing data of the designated field, wherein the starting location is based on the designated offset, and
      providing access to data for the designated field stored in the serialization buffer starting at the starting location of the serialization buffer for storing data of the designated field,
    storing a copy of the serialization buffer on the storage device, wherein the copy of the serialization buffer is distinct from the serialization buffer;
    generating a modified-serialization-buffer format by modifying the serialization buffer format, wherein the modified-serialization-buffer format specifies one or more modified fields for storing data of the object and one or more modified offsets, wherein an offset of the one or more modified offsets corresponds to a field of the one or more modified fields, and wherein a modified offset of the one or more modified offsets refers to a storage location in a modified serialization buffer storing data for the corresponding modified field; and
    reading the copy of the serialization buffer into the modified serialization buffer arranged in the memory according to the modified-serialization-buffer format by at least:
      for at least one modified field of the one or more modified fields:
        determining whether the modified field corresponds to a corresponding field of the one or more fields of the serialization buffer format;
        after determining that the modified field corresponds to the corresponding field, copying data from the corresponding field of the copy of the serialization buffer into the modified field of the modified serialization buffer; and
      otherwise, writing a default value for the modified field into the modified serialization buffer.

11. The computing device of claim 10, wherein the one or more offsets are stored in a virtual table, and wherein the one or more fields for storing data comprise a virtual-table-reference field corresponding to a reference to the virtual table.

12. The computing device of claim 11, wherein the serialization buffer stores a plurality of copies of the object, wherein the virtual table is stored once in the serialization buffer starting at a virtual-table location, and wherein a copy of the object stores a reference to the virtual-table location in the virtual-table-reference field.

13. The computing device of claim 11, wherein the virtual table and the one or more fields for storing data are stored in the serialization buffer, wherein the designated field has a corresponding designated size, and wherein providing access to data for the designated field stored in the serialization buffer comprises:
- determining a data-field starting location in the tangible computer readable medium for storing the one or more fields for storing data;
- determining a starting address for the virtual table using the virtual-table-reference field;
- determining the designated offset based on the starting address for the virtual table;
- determining the starting location of the serialization buffer for storing data of the designated field based on the data-field starting location and the designated offset; and
- providing access to data of the designated size in the memory starting at the starting location of the serialization buffer for storing data of the designated field.

14. The computing device of claim 10, wherein the computing device further comprises a communication interface configured for communicating with a second computing device, and wherein the functions further comprise:
- sending the serialization buffer from the computing device using the communication interface.

15. The computing device of claim 10, wherein the functions further comprise:
- retrieving the copy of the serialization buffer from the storage device, wherein the copy of the serialization buffer uses the serialization buffer format, wherein an offset of the one or more offsets of the copy of the serialization buffer is the same as a corresponding offset of the one or more offsets of the serialization buffer, and wherein the copy of the serialization buffer is configured so that data is accessible for the designated field of the object stored in the copy of the serialization buffer by at least:
  - determining the designated offset corresponding to the designated field,
  - determining a starting location of the copy of the serialization buffer for storing data of the designated field, wherein the starting location is based on the designated offset, and
  - providing access to data for the designated field stored in the copy of the serialization buffer starting at the starting location of the copy of the serialization buffer for storing data of the designated field.

16. The computing device of claim 10, wherein the serialization buffer is stored in one contiguous block of memory, and wherein the one or more offsets refer to one or more memory locations within the one contiguous block of memory.

17. The computing device of claim 10, wherein determining whether the modified field corresponds to the corresponding field comprises:
- determining a modified offset of the one or more modified offsets corresponding to the modified field;
- determining whether the modified offset of the one or more modified offsets equals a predetermined field-deletion value; and
- after determining that the modified offset of the one or more modified offsets equals the predetermined field-deletion value, determining that the modified field does not correspond to the corresponding field.

18. An article of manufacture comprising a non-transitory computer readable medium configured to store at least executable instructions, wherein the executable instructions, when executed by a processor of a computing device, cause the computing device to perform functions comprising:
- generating an object in a serialization buffer stored by the computing device, the object as stored in the serialization buffer having a serialization buffer format, wherein the serialization buffer format specifies one or more fields for storing data of the object and one or more offsets, wherein an offset of the one or more offsets corresponds to a field of the one or more fields, wherein an offset of the one or more offsets refers to a storage location in the serialization buffer storing data for the corresponding field, and wherein the serialization buffer is configured so that data is accessible for a designated field of the object stored in the serialization buffer using the computing device by at least:
  - determining a designated offset of the one or more offsets corresponding to the designated field,
  - determining a starting location of the serialization buffer for storing data of the designated field, wherein the starting location is based on the designated offset, and
  - providing access to data for the designated field stored in the serialization buffer starting at the starting location of the serialization buffer for storing data of the designated field; and
- storing a copy of the serialization buffer on a storage device associated with the computing device, wherein the copy of the serialization buffer is distinct from the serialization buffer;
- generating a modified-serialization-buffer format by modifying the serialization buffer format, wherein the modified-serialization-buffer format specifies one or more modified fields for storing data of the object and one or more modified offsets, wherein an offset of the one or more modified offsets corresponds to a field of the one or more modified fields, and wherein a modified offset of the one or more modified offsets refers to a storage location in a modified serialization buffer storing data for the corresponding modified field; and
- reading the copy of the serialization buffer into the modified serialization buffer arranged in the memory according to the modified-serialization-buffer format by at least:
  - for at least one modified field of the one or more modified fields:
    - determining whether the modified field corresponds to a corresponding field of the one or more fields of the serialization buffer format;
    - after determining that the modified field corresponds to the corresponding field, copying data from the corresponding field of the copy of the serialization buffer into the modified field of the modified serialization buffer; and
  - otherwise, writing a default value for the modified field into the modified serialization buffer.

19. The article of manufacture of claim 18, wherein the functions further comprise:
- retrieving the copy of the serialization buffer from the storage device, wherein the copy of the serialization buffer uses the serialization buffer format, wherein an offset of the one or more offsets of the copy of the serialization buffer is the same as a corresponding offset of the one or more offsets of the serialization buffer, and wherein the copy of the serialization buffer is configured so that data is accessible for the designated field of the object stored in the copy of the serialization buffer by at least:
  - determining the designated offset corresponding to the designated field, determining a starting location of the copy of the serialization buffer for storing data of the designated field, wherein the starting location is based on the designated offset, and providing access to data for the designated field stored in the copy of the serialization buffer starting at the starting location of the copy of the serialization buffer for storing data of the designated field.

20. The article of manufacture of claim 18, wherein the one or more offsets are stored in a virtual table, and wherein the one or more fields for storing data comprise a virtual-table-reference field corresponding to a reference to the virtual table.

21. The article of manufacture of claim 20, wherein the serialization buffer stores a plurality of copies of the object, wherein the virtual table is stored once in the serialization buffer starting at a virtual-table location, and wherein a copy of the object stores a reference to the virtual-table location in the virtual-table-reference field.

22. The article of manufacture of claim 20, wherein the virtual table and the one or more fields for storing data are stored in the serialization buffer, wherein the designated field has a corresponding designated size, and wherein providing access to data for the designated field stored in the serialization buffer comprises:

determining a data-field starting location in the memory for storing the one or more fields for storing data;

determining a starting address for the virtual table using the virtual-table-reference field;

determining the designated offset based on the starting address for the virtual table;

determining the starting location of the serialization buffer for storing data of the designated field based on the data-field starting location and the designated offset; and providing access to data of the designated size in the memory starting at the starting location of the serialization buffer for storing data of the designated field.

23. The article of manufacture of claim 18, wherein the computing device further comprises a communication interface configured for communicating with a second computing device, and wherein the method further comprises:

sending the serialization buffer from the computing device using the communication interface.

\* \* \* \* \*